United States Patent
Campbell et al.

(10) Patent No.: US 11,734,505 B2
(45) Date of Patent: *Aug. 22, 2023

(54) SYSTEM AND METHOD FOR DOCUMENT BRANCHING

(71) Applicant: WORKIVA INC., Ames, IA (US)

(72) Inventors: Benjamin Paul Campbell, Missoula, MT (US); Matthew Peter Hinrichsen, Ames, IA (US); Dustin John Holmes, Ankeny, IA (US); Payson Merrit Lippert, Missoula, MT (US); Patrick C. Kujawa, Missoula, MT (US)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,257

(22) Filed: Aug. 5, 2022

(65) Prior Publication Data
US 2022/0374480 A1   Nov. 24, 2022

Related U.S. Application Data

(63) Continuation of application No. 17/207,110, filed on Mar. 19, 2021, now Pat. No. 11,443,108, which is a
(Continued)

(51) Int. Cl.
*G06F 40/10* (2020.01)
*G06F 40/18* (2020.01)
(Continued)

(52) U.S. Cl.
CPC ............. *G06F 40/18* (2020.01); *G06F 16/93* (2019.01); *G06F 16/986* (2019.01);
(Continued)

(58) Field of Classification Search
None
See application file for complete search history.

(56) References Cited

U.S. PATENT DOCUMENTS

| | | |
|---|---|---|
| 4,807,182 A | 2/1989 | Queen |
| 5,603,021 A | 2/1997 | Spencer et al. |
| (Continued) | | |

FOREIGN PATENT DOCUMENTS

WO   2008/107665 A2   9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.
(Continued)

*Primary Examiner* — Maikhanh Nguyen
(74) *Attorney, Agent, or Firm* — Faegre Drinker Biddle & Reath LLP

(57) ABSTRACT

Disclosed are systems and methods for document branching. In some embodiments, the method includes the steps of: obtaining a branch model associated with a set of related documents, the branch model comprising one or more branches, each branch of the one or more branches comprising a branch type and one or more nodes, the one or more branches comprising a primary branch associated with a primary document, the set of related documents comprising the primary document having a first document identifier; generating a secondary branch based upon a revision of the primary document, the secondary branch associated with a secondary document of the set of related documents, the secondary document having a second document identifier; and adding the secondary branch to the branch model.

22 Claims, 15 Drawing Sheets

Related U.S. Application Data continuation-in-part of application No. 16/994,944, filed on Aug. 17, 2020, now Pat. No. 11,100,281.

(51) Int. Cl.
*G06F 21/62* (2013.01)
*G06F 16/93* (2019.01)
*G06F 40/197* (2020.01)
*G06F 40/166* (2020.01)
*G06F 16/958* (2019.01)
*G06F 40/14* (2020.01)

(52) U.S. Cl.
CPC .......... *G06F 21/6209* (2013.01); *G06F 40/14* (2020.01); *G06F 40/166* (2020.01); *G06F 40/197* (2020.01)

(56) References Cited

U.S. PATENT DOCUMENTS

| | | |
|---|---|---|
| 5,729,730 A | 3/1998 | Wlaschin et al. |
| 5,758,356 A | 5/1998 | Hara et al. |
| 5,883,623 A | 3/1999 | Cseri |
| 6,057,837 A | 5/2000 | Hatakeda et al. |
| 6,138,130 A | 10/2000 | Adler et al. |
| 6,230,173 B1 | 5/2001 | Ferrel et al. |
| 6,252,605 B1 | 6/2001 | Beesley et al. |
| 6,460,059 B1 | 10/2002 | Wisniewski |
| 6,572,660 B1 | 6/2003 | Okamoto |
| 6,631,385 B2 | 10/2003 | Lee et al. |
| 6,741,998 B2 | 5/2004 | Ruth et al. |
| 6,792,454 B2 | 9/2004 | Nakano et al. |
| 6,848,077 B1 | 1/2005 | McBrearty et al. |
| 6,909,965 B1 | 6/2005 | Beesley et al. |
| 6,948,154 B1 | 9/2005 | Rothermel et al. |
| 7,080,065 B1 | 7/2006 | Kothuri et al. |
| 7,096,422 B2 | 8/2006 | Rothschiller et al. |
| 7,124,362 B2 | 10/2006 | Tischer |
| 7,181,467 B2 | 2/2007 | Kothuri |
| 7,219,108 B2 | 5/2007 | Kothuri et al. |
| 7,249,314 B2 | 7/2007 | Walker et al. |
| 7,424,671 B2 | 9/2008 | Elza et al. |
| 7,496,837 B1 | 2/2009 | Larcheveque et al. |
| 7,496,841 B2 | 2/2009 | Hadfield et al. |
| 7,587,471 B2 | 9/2009 | Yasuda et al. |
| 7,631,255 B2 | 12/2009 | Weise et al. |
| 7,734,714 B2 | 6/2010 | Rogers |
| 7,761,403 B2 | 7/2010 | Witkowski et al. |
| 7,792,847 B2 | 9/2010 | Dickerman et al. |
| 7,809,712 B2 | 10/2010 | Witkowski et al. |
| 7,827,208 B2 | 11/2010 | Bosworth et al. |
| 7,984,371 B2 | 7/2011 | Zdenek |
| 8,015,235 B1 | 9/2011 | Bauer et al. |
| 8,108,464 B1 | 1/2012 | Rochelle et al. |
| 8,307,337 B2 | 11/2012 | Chamieh et al. |
| 8,332,747 B2 | 12/2012 | Carro et al. |
| 8,335,783 B2 | 12/2012 | Milby |
| 8,412,813 B2 | 4/2013 | Carlson et al. |
| 8,423,471 B1 | 4/2013 | Emigh et al. |
| 8,527,865 B2 | 9/2013 | Li et al. |
| 8,555,161 B2 | 10/2013 | Parker |
| 8,595,620 B2 | 11/2013 | Larsen et al. |
| 8,595,750 B2 | 11/2013 | Agarwal et al. |
| 8,607,207 B2 | 12/2013 | Chamieh et al. |
| 8,645,929 B2 | 2/2014 | Chamieh et al. |
| 8,656,290 B1 | 2/2014 | Greenspan et al. |
| 8,707,156 B2 | 4/2014 | Xue et al. |
| 8,745,483 B2 | 6/2014 | Chavoustie et al. |
| 8,825,594 B2 | 9/2014 | Skaria et al. |
| 8,849,834 B2 | 9/2014 | Milby |
| 8,856,234 B2 | 10/2014 | Kluin et al. |
| 8,869,020 B2 | 10/2014 | Daga |
| 8,954,457 B2 | 2/2015 | Fablet et al. |
| 9,015,301 B2 | 4/2015 | Redlich et al. |
| 9,152,686 B2 | 10/2015 | Whitehead et al. |
| 9,251,235 B1 | 2/2016 | Hurst et al. |
| 9,292,366 B2 | 3/2016 | Carro et al. |
| 9,292,482 B1 | 3/2016 | Thiesen et al. |
| 9,292,507 B2 | 3/2016 | Calkowski et al. |
| 9,552,343 B2 | 1/2017 | Thiesen et al. |
| 9,613,055 B2 | 4/2017 | Tyercha et al. |
| 9,720,931 B2 | 8/2017 | Tyercha et al. |
| 10,133,708 B2 | 11/2018 | Carro et al. |
| 10,140,269 B2 | 11/2018 | Vogel et al. |
| 10,147,054 B2 | 12/2018 | Dayon et al. |
| 10,223,340 B2 | 3/2019 | Soni |
| 10,325,014 B2 | 6/2019 | Nelson et al. |
| 10,331,776 B2 | 6/2019 | Thiesen et al. |
| 10,635,744 B2 | 4/2020 | Beth et al. |
| 10,878,182 B2 | 12/2020 | Thiesen et al. |
| 10,902,185 B1 | 1/2021 | Cairns |
| 10,936,808 B2 | 3/2021 | Soni |
| 10,956,446 B1 | 3/2021 | Hurst et al. |
| 11,048,885 B2 | 6/2021 | Liu et al. |
| 2002/0049697 A1 | 4/2002 | Nakano et al. |
| 2002/0065848 A1 | 5/2002 | Walker et al. |
| 2002/0103825 A1 | 8/2002 | Bauchot |
| 2003/0028545 A1 | 2/2003 | Wang et al. |
| 2003/0079157 A1 | 4/2003 | Lee et al. |
| 2003/0112273 A1 | 6/2003 | Hadfield et al. |
| 2003/0121008 A1 | 6/2003 | Fischer |
| 2003/0128243 A1 | 7/2003 | Okamoto et al. |
| 2004/0024752 A1 | 2/2004 | Manber et al. |
| 2004/0133567 A1 | 7/2004 | Witkowski et al. |
| 2004/0172616 A1 | 9/2004 | Rothschiller et al. |
| 2004/0181543 A1 | 9/2004 | Wu et al. |
| 2004/0193615 A1 | 9/2004 | Kothuri |
| 2005/0132070 A1 | 6/2005 | Redlich et al. |
| 2005/0149851 A1 | 7/2005 | Mittal |
| 2006/0044307 A1 | 3/2006 | Song |
| 2006/0080594 A1 | 4/2006 | Chavoustie et al. |
| 2006/0085386 A1 | 4/2006 | Thanu et al. |
| 2006/0101324 A1 | 5/2006 | Goldberg et al. |
| 2006/0143607 A1 | 6/2006 | Morris |
| 2006/0224946 A1 | 10/2006 | Barrett et al. |
| 2006/0271868 A1 | 11/2006 | Sullivan et al. |
| 2007/0033519 A1 | 2/2007 | Zdenek |
| 2007/0055989 A1 | 3/2007 | Shanks et al. |
| 2007/0124281 A1 | 5/2007 | Cowan |
| 2007/0136698 A1 | 6/2007 | Trujillo et al. |
| 2007/0186157 A1 | 8/2007 | Walker et al. |
| 2007/0219956 A1 | 9/2007 | Milton |
| 2007/0220415 A1 | 9/2007 | Cheng et al. |
| 2007/0245409 A1 | 10/2007 | Harris et al. |
| 2008/0005164 A1 | 1/2008 | Yee et al. |
| 2008/0114720 A1 | 5/2008 | Smith et al. |
| 2008/0134138 A1 | 6/2008 | Chamieh et al. |
| 2008/0148140 A1 | 6/2008 | Nakano |
| 2008/0162532 A1 | 7/2008 | Daga |
| 2008/0177825 A1 | 7/2008 | Dubinko et al. |
| 2008/0300864 A1 | 12/2008 | Smith |
| 2008/0306983 A1 | 12/2008 | Singh |
| 2009/0044283 A1 | 2/2009 | Yoshihama |
| 2009/0063949 A1 | 3/2009 | Duan |
| 2009/0094242 A1 | 4/2009 | Lo et al. |
| 2009/0100324 A1 | 4/2009 | Aureglia et al. |
| 2009/0150426 A1 | 6/2009 | Cannon et al. |
| 2009/0182763 A1 | 7/2009 | Hawking |
| 2009/0182837 A1 | 7/2009 | Rogers |
| 2009/0199090 A1 | 8/2009 | Poston et al. |
| 2009/0292730 A1 | 11/2009 | Li et al. |
| 2009/0327213 A1 | 12/2009 | Choudhary |
| 2010/0058176 A1 | 3/2010 | Carro et al. |
| 2010/0077331 A1 | 3/2010 | Bargh et al. |
| 2010/0257439 A1 | 10/2010 | Xue et al. |
| 2011/0106795 A1 | 5/2011 | Maim |
| 2011/0202968 A1 | 8/2011 | Nurmi |
| 2011/0271179 A1 | 11/2011 | Jasko et al. |
| 2012/0030563 A1 | 2/2012 | Lemonik et al. |
| 2012/0136874 A1 | 5/2012 | Milby |
| 2012/0137308 A1 | 5/2012 | Agarwal et al. |
| 2012/0151312 A1 | 6/2012 | Clee et al. |
| 2012/0173612 A1 | 7/2012 | Vegesna-Venkata et al. |
| 2012/0330984 A1 | 12/2012 | Fablet et al. |

(56) References Cited

U.S. PATENT DOCUMENTS

| | | |
|---|---|---|
| 2012/0331379 A1 | 12/2012 | Carro et al. |
| 2013/0232475 A1 | 9/2013 | Chamieh et al. |
| 2014/0047327 A1 | 2/2014 | Larsen et al. |
| 2014/0082470 A1 | 3/2014 | Frebas et al. |
| 2014/0129645 A1 | 5/2014 | Mo |
| 2014/0181016 A1 | 6/2014 | Whitehead et al. |
| 2014/0188544 A1 | 7/2014 | Senescu |
| 2014/0245257 A1 | 8/2014 | Kusmer et al. |
| 2014/0281870 A1 | 9/2014 | Vogel et al. |
| 2014/0282101 A1 | 9/2014 | Beechuk et al. |
| 2015/0052100 A1 | 2/2015 | Calkowski et al. |
| 2015/0058449 A1 | 2/2015 | Garg et al. |
| 2015/0100304 A1 | 4/2015 | Tealdi et al. |
| 2015/0100594 A1 | 4/2015 | Hess et al. |
| 2015/0199270 A1 | 7/2015 | Day-Richter et al. |
| 2015/0324373 A1 | 11/2015 | Tyercha et al. |
| 2015/0324399 A1 | 11/2015 | Tyercha et al. |
| 2016/0041963 A1 | 2/2016 | Coblenz et al. |
| 2016/0162128 A1 | 6/2016 | Hansen et al. |
| 2016/0162461 A1 | 6/2016 | Simon et al. |
| 2016/0239488 A1 | 8/2016 | Aguilon et al. |
| 2016/0344667 A1 | 11/2016 | Lane et al. |
| 2016/0378737 A1 | 12/2016 | Keslin et al. |
| 2017/0132188 A1 | 5/2017 | Thiesen et al. |
| 2017/0220546 A1 | 8/2017 | Codrington et al. |
| 2017/0308511 A1 | 10/2017 | Beth et al. |
| 2018/0165260 A1 | 6/2018 | Soni |
| 2019/0102370 A1 | 4/2019 | Nelson et al. |
| 2020/0250383 A1 | 8/2020 | Cheng |
| 2021/0064817 A1 | 3/2021 | Deering et al. |
| 2021/0081605 A1 | 3/2021 | Smith et al. |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

ExtendOffice, "How to insert multiple hyperlinks in a cell in Excel?", ExtendOffice.com, <https://web.archive.org/web/20150409040726/https://www.extendoffice.com/documents/excel/916-excel-insert-mulitple-hyperlinks.html>, 2015, 3 pages.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Guttman, "R-Trees: A Dynamic Index Structure for Spatial Searching," ACM, 1984, pp. 47-57.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic_graph-based_visualization_for_spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Stanescu et al., "Using R-trees in content-based region query with spatial bounds," Seventh International Symposium on Symbolic and Numeric Algorithms for Scientific Computing (SYNASC'05), Timisoara, Romania, 2005, 7 pages.

Tang et al., "Novel DR-tree index based on the diagonal line of MBR," 2012 8th International Wireless Communications and Mobile Computing Conference (IWCMC), Limassol, Cyprus, 2012, pp. 574-579.

Yang et al., "Performance of R-Tree with Slim-Down and Reinsertion Algorithm," 2010 International Conference on Signal Acquisition and Processing, Bangalore, India, 2010, pp. 291-294.

FIG. 4A
FIG. 4B
FIG. 4C
FIG. 4D
FIG. 4E

FIG. 5A

Sheet1_v4

| | A | B |
|---|---|---|
| 1 | 1 | =SUM(A)=1 |
| 2 | | 0 (S2A2) |

Sheet2_v3

| | A | B |
|---|---|---|
| 1 | 1 (S1B1) | |
| 2 | =A1*3=... | |

FIG. 5B

Sheet1_v5

| | A | B |
|---|---|---|
| 1 | 1 | =SUM(A)=3 |
| 2 | 2 | 0 (S2A2) |

Sheet2_v3

| | A | B |
|---|---|---|
| 1 | 1 (S1B1) | |
| 2 | =A1*3=3 | |

FIG. 5C

Sheet1_v6

| | A | B |
|---|---|---|
| 1 | 1 | =SUM(A)=3 |
| 2 | 2 | 3 (S2A2) |

Sheet2_v4

| | A | B |
|---|---|---|
| 1 | 3 (S1B1) | |
| 2 | =A1*3=... | |

FIG. 5D

Sheet1_v6

| | A | B |
|---|---|---|
| 1 | 1 | =SUM(A)=3 |
| 2 | 2 | 3 (S2A2) |

Sheet2_v4

| | A | B |
|---|---|---|
| 1 | 3 (S1B1) | |
| 2 | =A1*3=9 | |

FIG. 5E

Sheet1_v7

| | A | B |
|---|---|---|
| 1 | 1 | =SUM(A)=3 |
| 2 | 2 | 9 (S2A2) |

Sheet2_v4

| | A | B |
|---|---|---|
| 1 | 3 (S1B1) | |
| 2 | =A1*3=9 | |

SYSTEM AND METHOD FOR DOCUMENT BRANCHING

CROSS-REFERENCE TO RELATED APPLICATIONS

This application is a continuation of U.S. patent application Ser. No. 17/207,110, filed Mar. 19, 2021, which is a continuation-in-part of U.S. patent application Ser. No. 16/994,944 filed Aug. 17, 2020, now U.S. Pat. No. 11,100,281. This application is related to U.S. patent application Ser. No. 16/292,701, filed Mar. 5, 2019, now U.S. Pat. No. 10,733,369, which is a continuation of U.S. patent application Ser. No. 16/008,295, filed Jun. 14, 2018, now U.S. Pat. No. 10,275,441, which is a divisional of U.S. patent application Ser. No. 15/922,424, filed Mar. 15, 2018, now U.S. Pat. No. 10,255,263, which is a continuation-in-part of U.S. patent application Ser. No. 15/188,200, filed Jun. 21, 2016, now U.S. Pat. No. 10,019,433, which is a continuation of U.S. patent application Ser. No. 14/850,156, filed Sep. 10, 2015, now U.S. Pat. No. 9,378,269, which is a continuation of U.S. patent application Ser. No. 14/714,845, filed May 18, 2015, now U.S. Pat. No. 9,158,832. This application is also related to U.S. patent application Ser. No. 16/871,512, filed on May 11, 2020. Each of the above documents is incorporated herein by reference in its entirety.

TECHNICAL FIELD

The present disclosure relates generally to electronic document management and, more particularly, to a data storage and retrieval system and method for maintaining links, revisions, translations, reviews, comments, and other information in a plurality of documents.

BACKGROUND

Keeping track of different types of data entries and interdependencies among the different entries is a task for which computers are ideally suited, and modern society depends heavily on this capability. From social networking platforms to financial analysis applications, computers, along with robust communication networks, are able to propagate a change in one data item (e.g., a change in a cell of a spreadsheet or a change in a user's status on a social network) to other data items (e.g., a recalculation of a formula in a spreadsheet or an update of an emoticon on the devices of the user's friends).

One problem that arises with propagating changes among many interdependent data entries is that it can be very slow when the number of entries and interdependencies is high and when the entries are stored across different documents, databases, servers and different geographical locations of the servers. For example, those who work with large spreadsheets are familiar with the experience in which, when a change is made to one cell of a spreadsheet, the spreadsheet program spends a long time updating itself repeatedly as the formulas depending on the changed cell get recalculated, the formulas depending on those formulas get recalculated, and so on. Dependencies that cross documents or servers create similar delays.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIGS. 4A to 4E and FIGS. 5A to 5E are diagrams showing a sequence of timeslices of revisions to spreadsheets with cells having formula dependencies and linking dependencies using document revision counters, according to an embodiment;

DETAILED DESCRIPTION

In systems configured to maintain multiple documents with various dependencies on each other, and particularly those with dozens of documents of different types, the accuracy of a report or displayed output that purports to capture a "snapshot" or "time slice" of the content of the documents may depend upon whether a change in one document has propagated to another document. In some scenarios, a user viewing several documents at the same time, but where those documents are only a subset of the entire set of documents, may not be able to view an accurate snapshot until the changes have been propagated across the entire set. As one example, when a cell in a spreadsheet is used as a "source" for content displayed in a "destination" 10-K financial document and also used in a destination Exhibit document, a change made to the source spreadsheet may be propagated to the 10-K document first (i.e., before the change has propagated to the Exhibit), so at a certain time slice, the 10-K document has been updated, but the Exhibit document has not yet been updated, and a user viewing both the 10-K document and the Exhibit document at the same time may become confused when entries between the destination documents, with purportedly the same values, do not match each other.

Disclosed herein is a system for maintaining links, revisions, reviews, comments, translations, and other information for a plurality of documents. Various embodiments of the disclosure are implemented in a computer networking environment. In some embodiments, the system is configured to receive requests that indicate revisions to be carried out on the plurality of documents where at least one of the requests corresponds to revisions for different documents of the plurality of documents. The plurality of documents may be referred to herein as a "workspace," for example, a shared repository of a group of documents for a corporation or business unit. For each of the received requests, a workspace revision counter that is shared by the plurality of documents is incremented. The workspace revision counter indicates a revision state of the plurality of documents. In other words, the workspace revision counter indicates a revision state of the documents as an integral data unit, as opposed to separate data units for each document with respective document revision counters. A revision indicated by a request is caused to be performed on one or more documents that correspond to the request. In some scenarios, a single request indicates changes to multiple documents, for example, a request to update a link between a source element and a destination element.

Figure 1:
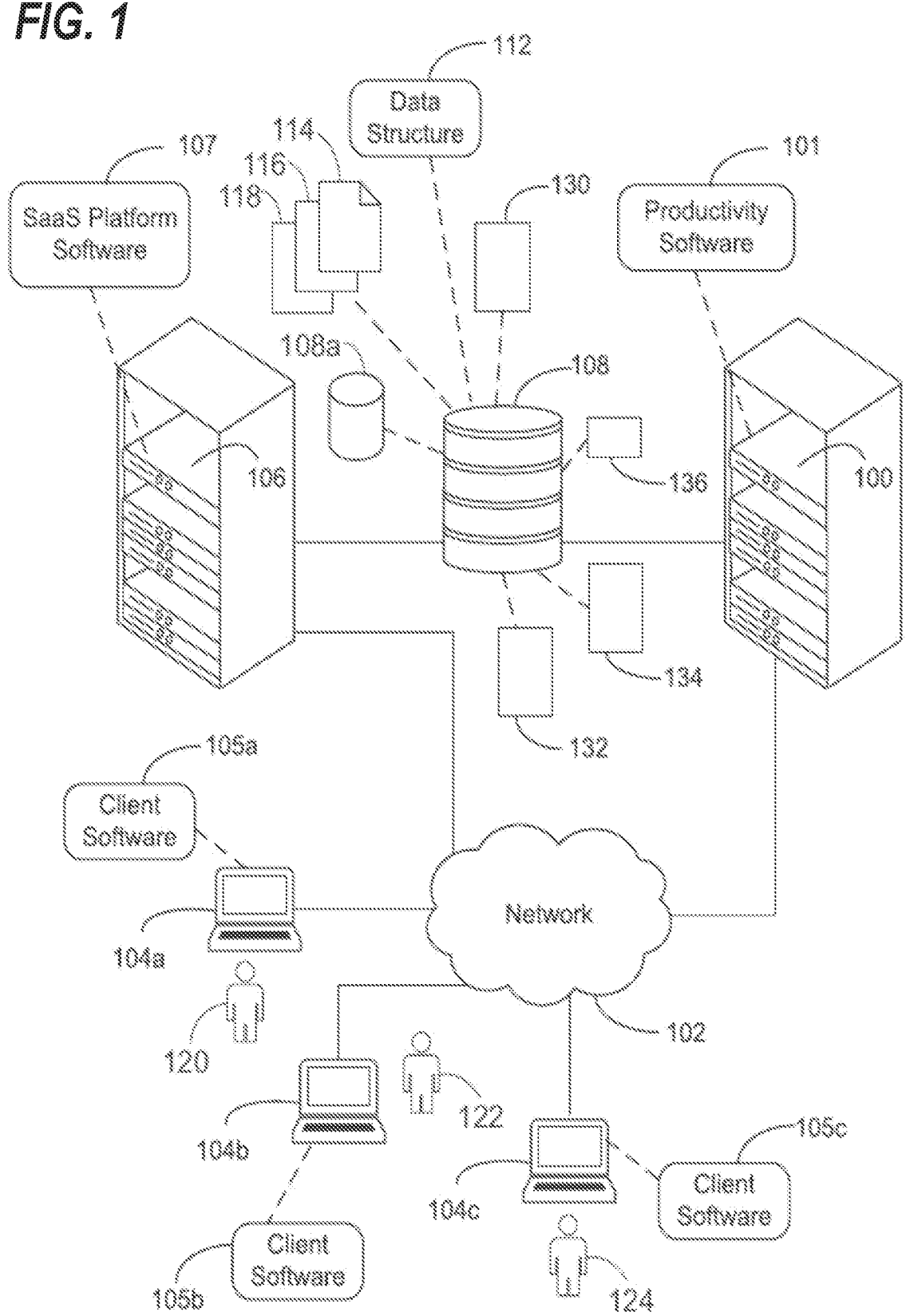
FIG. 1 is an example of a networking environment in which various embodiments of the disclosure may be implemented, according to an embodiment.

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

In various embodiments, at least some documents are stored using a suitable data structure configured to maintain links and references between cells, tables, paragraphs, sections, or other suitable portions of a document. In an embodiment, documents are stored using an RTree (a type of logic tree) data structure. In another embodiment, documents are stored using a causal tree data structure.

In an embodiment, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108*a* and providing a programming platform for various processes launched by the productivity software (e.g., to manipulate, store, and retrieve documents and other information from the database 108*a*). Under the control of the productivity software 101, the productivity server 100 interacts with the database server 106 (which operates under the control of the SaaS platform software 107) and the computing devices 104*a*, 104*b*, and 104*c* (also referred to as "client devices") to allow the computing devices to access the first document 114, the second document 116, and the third document 118 so that the first user 120, the second user 122, and the third user 124 can collaborate in editing the documents (e.g., moving sections around in a particular document).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized.

Figure 2:
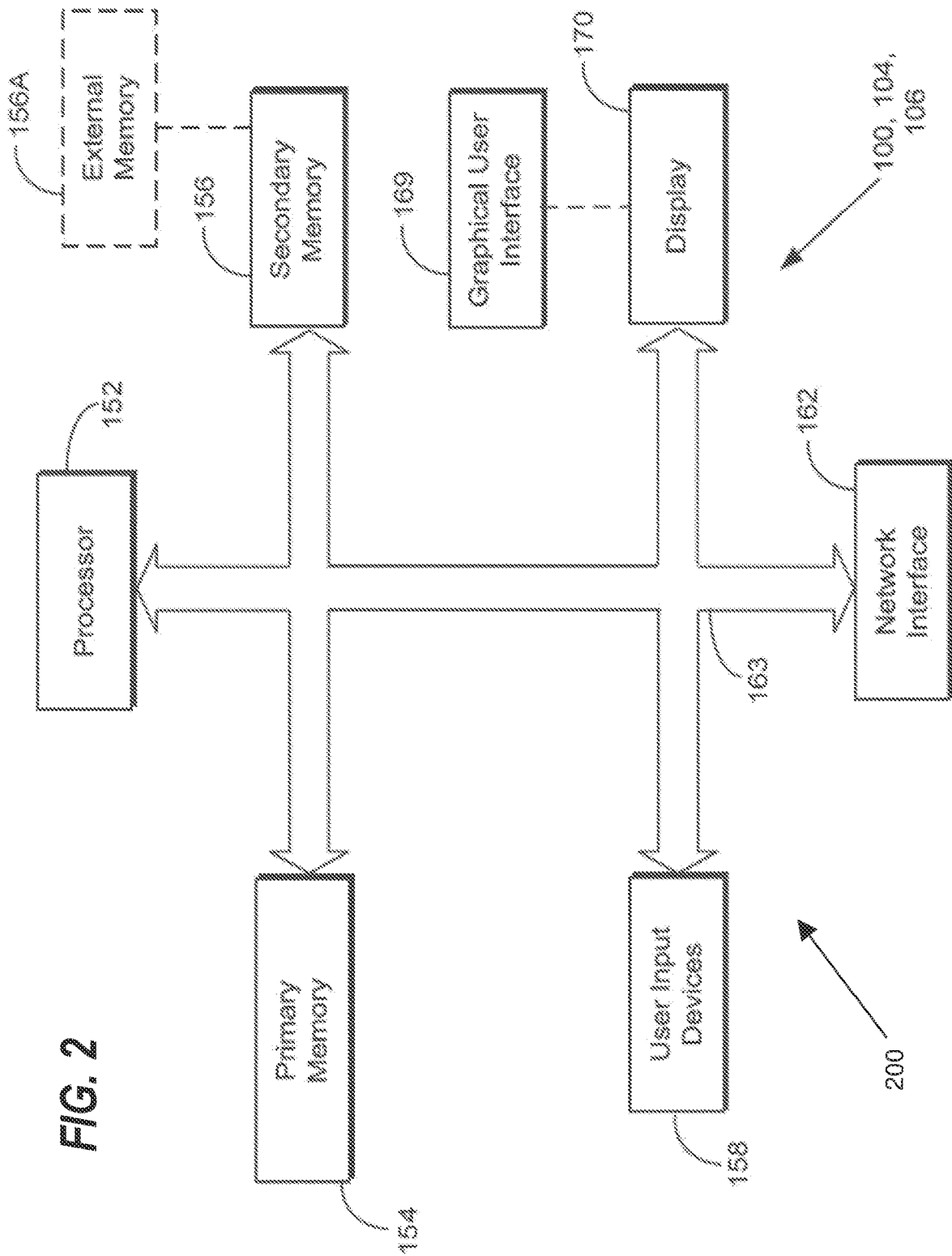
FIG. 2 is a block diagram of a computing device, according to an embodiment.

FIG. 2 is a block diagram of a computing device 200, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both of the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 152. In an embodiment, this communication takes place via a user interface that the productivity server 150 provides to the computing devices 154*a*, 154*b*, and 154*c*. The specific nature of the user interface and what the user interface shows at any given time may vary depending on what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 3:
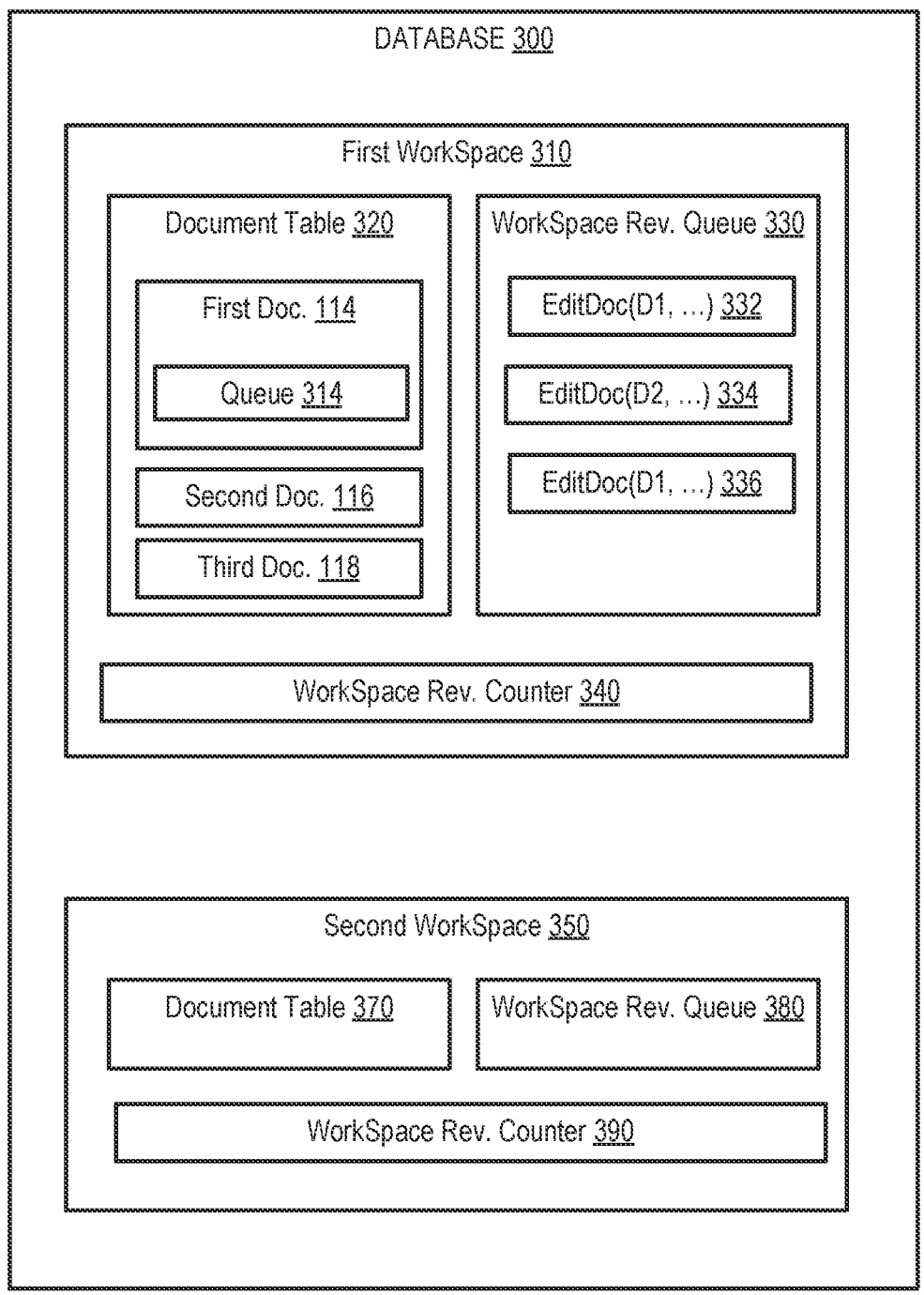
FIG. 3 is a block diagram of an example database configured to store workspaces with separate revision counters using the computing device of FIG. 2, according to an embodiment.

FIG. 3 is a block diagram of an example database 300 configured to store workspaces with separate revision counters using the computing device of FIG. 2. In the embodiment shown in FIG. 3, the database 300 generally corresponds to the database 108*a* and includes the first document 114, the second document 116, and the third document 118. In other embodiments, the database 300 includes one, two, four, or more documents.

In various embodiments, the database 300 includes a first workspace 310 having a document table 320, a workspace revision queue 330, and a workspace revision counter 340. The first workspace 310 represents a shared repository of a plurality of documents. In some scenarios, the repository is associated with a corporation, business unit, user group, or other entity. The plurality of documents may be of the same or different types in various embodiments, for example, spreadsheet documents, text documents, presentation documents, or other suitable document types. In an embodiment, the workspace 310 is configured to store the plurality of documents (i.e., documents 114, 116, and 118), or suitable data structures associated with the documents, in the document table 320.

The workspace revision counter 340 (or "workspace level revision counter") is configured to be shared by the plurality of documents and indicates a revision state of the plurality of documents at any given point in time. In other words, the workspace revision counter 340 indicates a revision state of the plurality of documents as an integral data unit, as opposed to separate document revision counters for individual documents ("document level revision counters"). The workspace revision counter 340 is a workspace level revision for grouping the revision of all workspace content at any given point in time within a workspace. By sharing the workspace revision counter 340 among the plurality of documents, a change or revision to any single document causes an increment to the workspace revision counter 340. As an example, when a first change to a first document in the workspace 310 increments the workspace revision counter from 7 to 8, then a second change to a second document in the workspace 310 occurring after the first change increments the workspace revision counter 340 from 8 to 9. In a further example, the workspace revision counter 340 is incremented from 9 to 10 when a third change to the first document is requested.

The workspace revision queue 330 is configured to store revisions to the plurality of documents, more specifically, requests for revisions. The workspace revision queue 330 is shared by the plurality of documents and stores revisions to different documents of the plurality of documents. In various embodiments, the workspace revision queue 330 is a queue for ordering requests for revisions in an linear fashion across the entire workspace. In the embodiment shown in FIG. 3, using the above example, the first change to the first document, the second change to the second document, and the third change to the first document are queued as revisions 332, 334, and 336. In an embodiment, the computing device 200 processes or performs the revisions in the workspace revision queue 330 in a first in, first out (FIFO) manner. In other embodiments, the computing device 200 prioritizes at least some of the revisions, for example, based on a priority level of the corresponding document to be revised, a priority level of a user that requested the revision, or other suitable criteria. In some embodiments, the computing device 200 groups at least some of the revisions in the workspace revision queue 330, for example, according to whether the revisions can be performed in parallel.

In the embodiment shown in FIG. 3, the database 300 also includes a second workspace 350 having a document table 370, a workspace revision queue 380, and a workspace revision counter 390 (analogous to the document table 320, the workspace revision queue 330, and the workspace revision counter 340). In some embodiments, the database 300 is configured to provide a separate workspace for different pluralities of documents, for example, for different corporations, business units, user groups, or other entities.

In some embodiments, the database 300 includes a document revision queue for one or more of the plurality of documents. The document revision queue is configured to store temporary copies of revision and is not shared among the plurality of documents, but is instead specific to a particular document. In an embodiment, for example, the first document 114 includes a document revision queue 314. The document revision queue allows for separate versions or branches of a document to be maintained concurrently, as described herein. In an embodiment, the document revision queue is specific to a locked section of a document where the locked section is a section of the document that is restricted from editing by users outside of an editing group.

FIGS. 4A to 4E and FIGS. 5A to 5E are diagrams showing a sequence of timeslices for revisions to spreadsheets with cells having formula dependencies and linking dependencies using document revision counters. In the embodiment shown, the sequence shows revisions to a first spreadsheet document (referred to herein as "Sheet1") and a second spreadsheet document ("Sheet2") with versions indicated as "v1", "v2", and so on. Notably, the version numbers of the documents are independent of each other. For ease of description, only two columns ("A" and "B") and two rows ("1" and "2") are shown in FIGS. 4A to 4E and FIGS. 5A to 5E.

FIG. 4A shows an initial state of the documents with both the first document and the second document at version 1 ("Sheet1_v1" and "Sheet2_v1") with empty cells. At FIG. 4B, Sheet1 has been modified and advances to revision 2 ("v2") to include a formula in cell B1, specifically, a summation of the values in column A ("=SUM(A)=0"). Since cells A1 and A2 are empty, the summation of cell B1 of Sheet1 in FIG. 4B is zero. At FIG. 4C, Sheet2 has been modified and advances to revision 2, where cell A1 of Sheet2 contains a link to cell B1 of Sheet1 (the link is represented by "S1B1") and cell A2 contains a formula that relies upon cell A1 ("=A1*3=0"). The link indicates that cell B1 of Sheet1 is a source element for cell A1 of Sheet2, which is a destination element. At FIG. 4D, Sheet1 has been modified and advances to version 3 ("v3"), where cell B2 contains a link to cell A2 of Sheet2 (the link is represented by "S2A2"). In other words, cell A2 of Sheet2 is the source of the link, and cell B2 of Sheet1 the destination of the link.

As used herein, a link is a reference, pointer, or data structure that refers to linked content (or the location of the linked content), while linked content is a set of content, for example, a set of one or more characters or numbers, a set of one or more sentences, a set of one or more paragraphs, a set of one or more cells within a spreadsheet, a set of one or more images, or various combinations thereof. For example, in FIG. 4C, the value 0 in cell A1 of Sheet2 is the linked content, and "S1B1" is a representation that indicate that cell A1 of Sheet2 contains a link. Although "S1B1" and "52A2" are used to represent links in FIGS. 4C to 4E and 5A to 4E, the user interface may not display these representations. In various implementations, no visual indicator or different visual indicators (e.g., icons, underlining, different font color or font face, different background color, a box that surrounds the link, etc.) may be used to indicate the existence of a link, the source of a link, or the destination of a link. In other embodiments, a user may need to perform another gesture on the user interface (e.g., hover, right click, double click, etc.) to trigger the display of the source(s) or destination(s) of a link (e.g., via a pop-up panel or side panel). In an embodiment, the linked set of content contains a plurality of elements (i.e., characters, cells, paragraphs, etc.) that appear consecutively within a document, for example, cells A4 through A7 of a spreadsheet or sentences one through five of a text document. In another embodiment, the linked set of content contains a plurality of elements that do not appear consecutively, for example, cells B18:C20 of a spreadsheet (i.e., cells B18, B19, B20, C18, C19, and C20).

At FIG. 4E, Sheet1 has been modified and advances to version 4 ("v4"), where cell A1 has a value of 1 and cell B1, based on its formula, has its displayed value changed to 1. In some scenarios, the link of cell A1 in Sheet2 is not immediately updated, for example, due to processing delays associated with identifying when a source element has changed. Accordingly, at the timeslice shown in FIG. 4E, Sheet2 has not yet been updated to a new version.

At FIG. 5A, the link of cell A1 in Sheet2 has been updated to include the appropriate value from source element B1 of Sheet1 ("1"), cell A2 in Sheet2 is being processed to calculate its formula, and Sheet2 advanced to version 3. In some scenarios, the formula in cell A2 is relatively complex and may have a long processing time (e.g., several minutes or more) before its value has been determined. In other scenarios, the formula may refer to an external source (e.g., a document outside of the workspace 310) that may have reduced availability or delayed updates, for example, by being stored on a remote computer. In still other scenarios, the formula may include a link to another "busy" document that is being used by many other users so that access to its data is delayed.

At FIG. 5B, the formula in cell A2 of Sheet2 has been calculated, a value of "2" has been inserted in cell A2 of Sheet1, the formula in cell B1 of Sheet1 is updated to a value of 3, and Sheet1 has advanced to version 4 ("v5"), but the link in cell B2 of Sheet1 has not yet been updated with the result of the formula in cell A2 of Sheet2. At this timeslice, Sheet1 is inconsistent with itself because the value of cell A2 in Sheet2 has not propagated to cell B2 of Sheet1. Moreover, Sheet2 is not consistent with Sheet1 because cell A1 of Sheet2 has not been updated with the updated value ("3") of cell B1 of Sheet1.

At FIG. 5C, cell B2 of Sheet1 has been updated to the most recent confirmed value of its link to cell A2 of Sheet2 and Sheet1 advances to version 6 ("v6"). Additionally, cell A1 of Sheet2 is updated to the most recent value of source cell B1 and Sheet2 advances to version 4 ("v4"). At FIG. 5D, cell A2 of Sheet2 has been calculated, but the value is not propagated to cell B2 of Sheet1 until FIG. 5E.

One solution to the problem of propagating values, either through formulas or links, is to utilize the workspace revision counter 340. Although the workspace revision counter 340 may be incremented more often and more quickly than individual document revision counters, the workspace revision counter 340 provides a single value that can be referenced to refer to a single timeslice for all documents in the workspace 310 where all values have been propagated.

Figure 6:
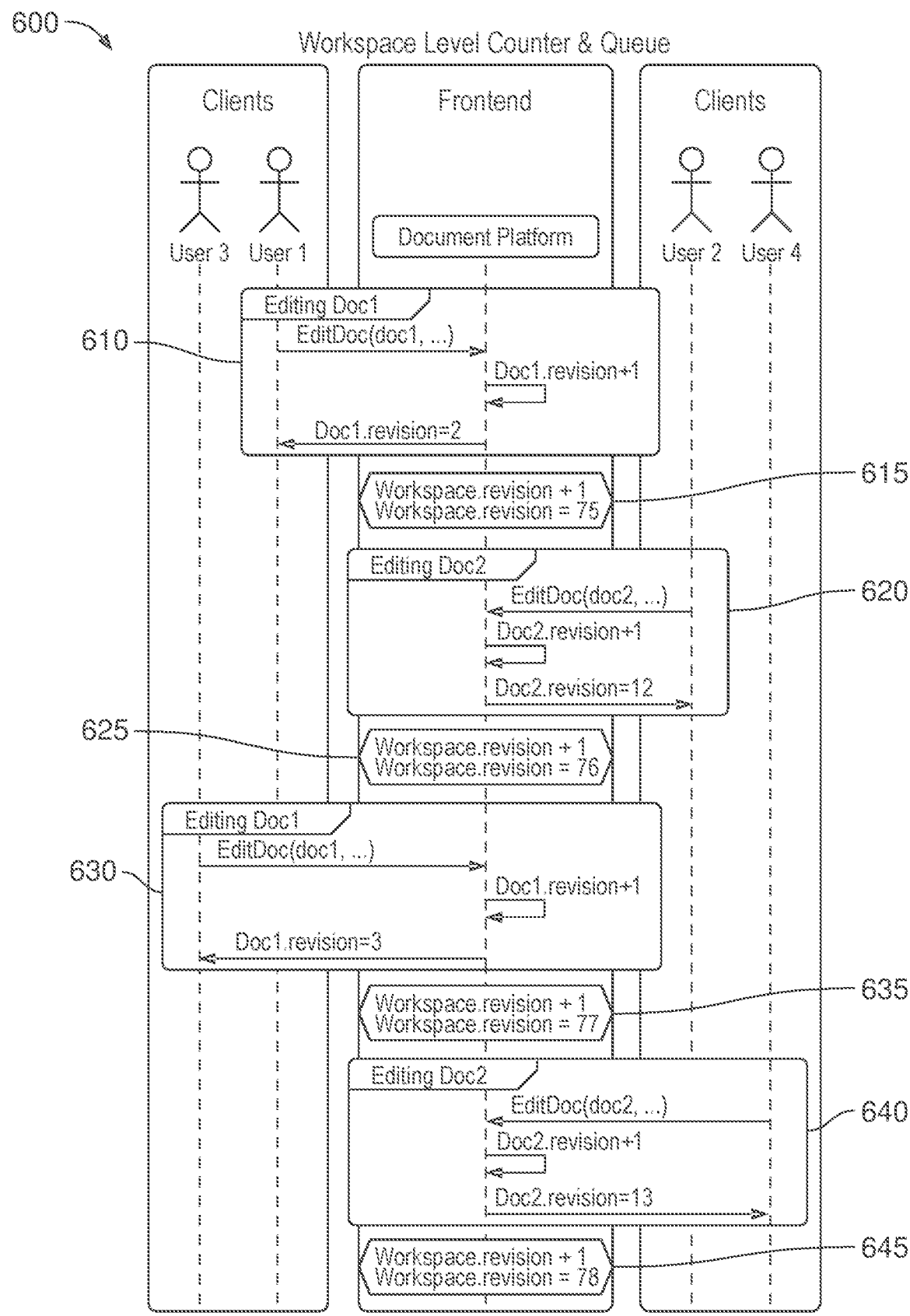
FIG. 6 is a flow diagram showing a sequence of revisions to documents using a workspace revision counter and document revision counters, according to an embodiment.

FIG. 6 is a flow diagram showing a sequence 600 of revisions to documents using a workspace revision counter, for example, the workspace revision counter 340, according to an embodiment. In the embodiment shown in FIG. 6, first and second documents ("Doc1" and "Doc2") are provided for editing to various clients (including Users 1, 2, 3, and 4) by a frontend user interface ("frontend"). In some embodiments, the frontend user interface is provided by the first computing device 100, the fifth computing device 106, or another suitable computing device. In some embodiments, the clients utilize respective ones of the computing devices 104*a*, 104*b*, 104*c*. In the embodiment shown in FIG. 6, User1 and User3 modify the first document, while User2 and User4 modify the second document, via respective user interfaces. Although only two documents and four clients are shown, in other embodiments, the frontend may provide hundreds of documents to hundreds of clients concurrently.

During block 610, User1 sends a request for a revision to the first document ("EditDoc(doc1, . . . )") and the request is received by the frontend. In some scenarios, the request includes one, two, three, or more revisions. The frontend causes the revision to be performed on the first document, for example, by updating the first document within the database 108*a*, and increments a document revision counter ("Doc1.revision+1"). The frontend provides the updated document revision counter ("2") to the User1.

During block 615, the frontend increments the workspace revision counter 340, resulting in a new value of "75". Although the most recent revision incremented the document revision counter of the first document to "2", the workspace revision counter 340 is utilized for each document in the workspace 310, so its value is higher than the document revision counter.

During block 620, User2 sends a request for a revision to the second document ("EditDoc(doc2, . . . )") and the request is received by the frontend. The frontend causes the revision to be performed on the second document, for example, by updating the first document within the database 108*a*, and increments a document revision counter ("Doc2.revision+1"). The frontend provides the updated document revision counter ("12") to the User2.

During block 625, the frontend increments the workspace revision counter 340, resulting in a new value of "76". Notably, revisions to both the first document and the second document result in updates to the same counter, specifically, the workspace revision counter 340. Subsequent revisions to the first document at block 630 and to the second document at block 640 include increments to the respective document revision counters and are also followed by updates to the workspace revision counter 340 at blocks 635 and 645.

In another embodiment, if a first document contains the source element of a link and a second document contains the destination element of the link, then when a user sends a request to edit the source element of the link (e.g., linked content or other properties of the link) in the first document, the request will also trigger a request to edit the destination element of the link in the second document. In other words, when a user makes a revision to the source element of the link in the first document, the revision is propagated to the destination element of the link in the second document. In this instance, the document revision counter of the first document will increment by 1, the document revision counter of the second document will increment by 1, and the workspace level counter will also increment by 1.

Cloud-based document collaboration platforms tend to be fully open and collaborative. That is, all users who are invited to edit a document (e.g., text document, graphics-based document, spreadsheet, or a hybrid of one or more of the foregoing) are able to see one another's edits in real time or nearly real time. However, there are many scenarios in which one or more users would prefer not to share their draft work product with other collaborators. In these scenarios, the user (or group of users) may create a branch of the document, or a branch of a portion thereof (e.g., a section of a document), where read and/or write access to the branch is limited to themselves only (a "private user") or to themselves and any additional users (a "private group"). Once a section becomes private, users other than the private user or those not within the private group will not be able to see additional edits being made but will only see the state of the section as it was just prior to being taken private. The private user or a user within the private group (assuming they have sufficient permission) can choose to make the edits public, which unlocks the private section and allows the rest of the collaborators to view the changes and to make their own edits to the section if desired.

In an embodiment, edits to the document are managed through the use of a causal tree or causal graph, and when a section of the document is taken private, the document collaboration system creates a copy of the relevant segment or segments of the causal tree or causal graph, uses the segment or segments to keep track of the edits and, when the section is subsequently made public, merges the segment or segments into the original causal graph.

In another embodiment, edits to the document are managed through the use of an Rtree (also referred to herein as "R-Tree"), and when a section of the document is taken private, the document collaboration system creates a copy of the relevant segment or segments of the Rtree, uses the segment or segments to keep track of the edits and, when the section is subsequently made public, merges the segment or segments into the original Rtree.

Figure 7:
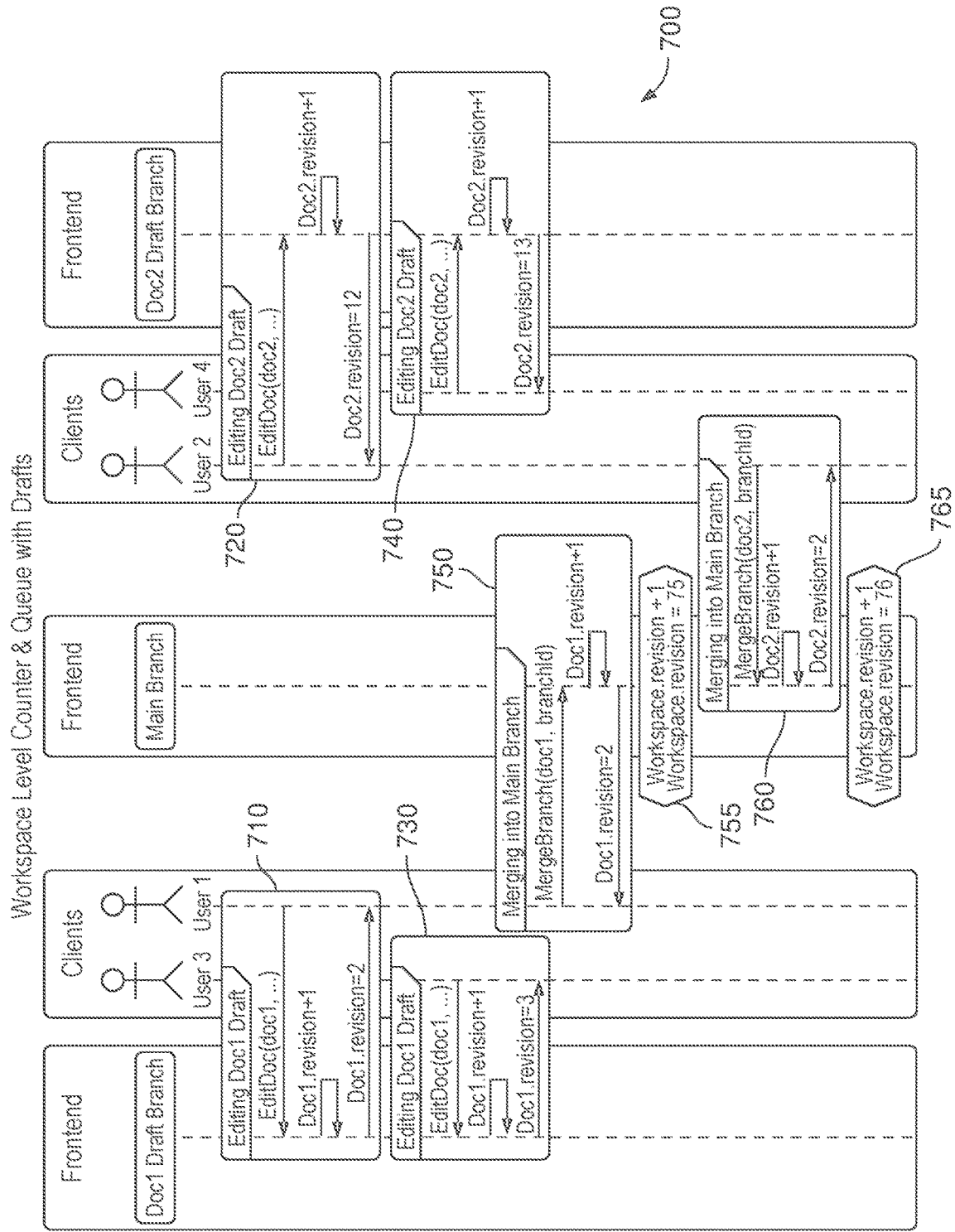
FIG. 7 is a flow diagram showing a sequence of revisions to documents having separate branches using a workspace revision counter and document revision counters, according to an embodiment.

FIG. 7 is a flow diagram showing a sequence 700 of revisions to documents having separate branches using a workspace revision counter and document revision counters, for example, the workspace revision counter 340. The embodiment shown in FIG. 7 is similar to that of FIG. 6, where first and second documents ("Doc1" and "Doc2") are provided for editing to various clients (including Users 1, 2, 3, and 4) by a frontend user interface ("frontend").

In the embodiment of FIG. 7, the revisions to the first and second documents are initially stored in a separate branch that may be combined with a main branch at a later time, discarded, or maintained separately from one or more other branches. As an example, a secondary branch of the first document 114 may be edited and reviewed by a user and changes by the user may be stored and managed in the document revision queue 314 without affecting a main branch of the first document 114. When the changes from the user are to be finalized and incorporated into the main branch (e.g., to publish an update to a publicly available document), the changes to the document may be incorporated into the main branch, for example, by merging or rebasing. In various embodiments, the main branch and any secondary branches are identified by respective branch identifiers ("branch IDs"), for example, a unique identifier, that allow revisions in a secondary branch to be incorporated into a main branch, revisions in a main branch to be incorporated into a secondary branch, etc.

Merging generally corresponds to a process of comparing a secondary branch to a main branch and making any needed changes to the main branch to be consistent with the secondary branch. Rebasing generally corresponds to a process of making the changes that were made on the secondary branch (relative to a common earlier base), but instead using a "sibling" branch as the new base to be modified. In other words, rebasing effectively "replays" changes from the secondary branch (e.g., stored in the document revision queue 314) onto another branch sequentially in the order they were introduced, whereas merging takes the endpoints of the branches and simply merges them together.

In the embodiment shown in FIG. 7, the first document and the second document have their own respective secondary branches ("Doc1 Draft Branch" and "Doc2 Draft Branch"). However, in other embodiments, two or more documents within a workspace are part of a same branch. In some embodiments, a branch for an entire workspace is created and later merged or rebased with another branch, or maintained separately.

At block 710 and block 730, respectively, User1 and User2 request revisions to the first document, analogously to blocks 610 and 630. Similarly, at blocks 720 and 740, User2 and User4 request revisions to the second document, analogously to blocks 620 and 640. The revisions corresponding to the first document are stored in the document revision queue 314, in an embodiment, and the revisions corresponding to the second document are stored in a corresponding document revision queue (not shown). In some other embodiments, the document revisions for the first document and the second document are stored in a same database or central repository, but are flagged as being limited to a particular branch, for example, using a branch identifier that uniquely identifies the branch.

At block 750, User1 requests a merge of the secondary branch of the first document with the main branch and the revisions stored in the document revision queue 314 are merged or rebased with those in the main branch. At block 755, the frontend increments the workspace revision counter 340. In this embodiment, the separate revisions of the first document at blocks 710 and 730 are combined into a same request for a revision and correspond to a same revision number ("75") for the workspace 310. Similarly, the separate revisions of the second document at blocks 720 and 740 are combined into a same request (block 760) for a revision and correspond to a same revision number ("76", block 765) for the workspace 310. The requests at blocks 750 and 760 identify the revisions to be incorporated into the main branch by using a branch identifier that corresponds to the branch.

Figure 8:
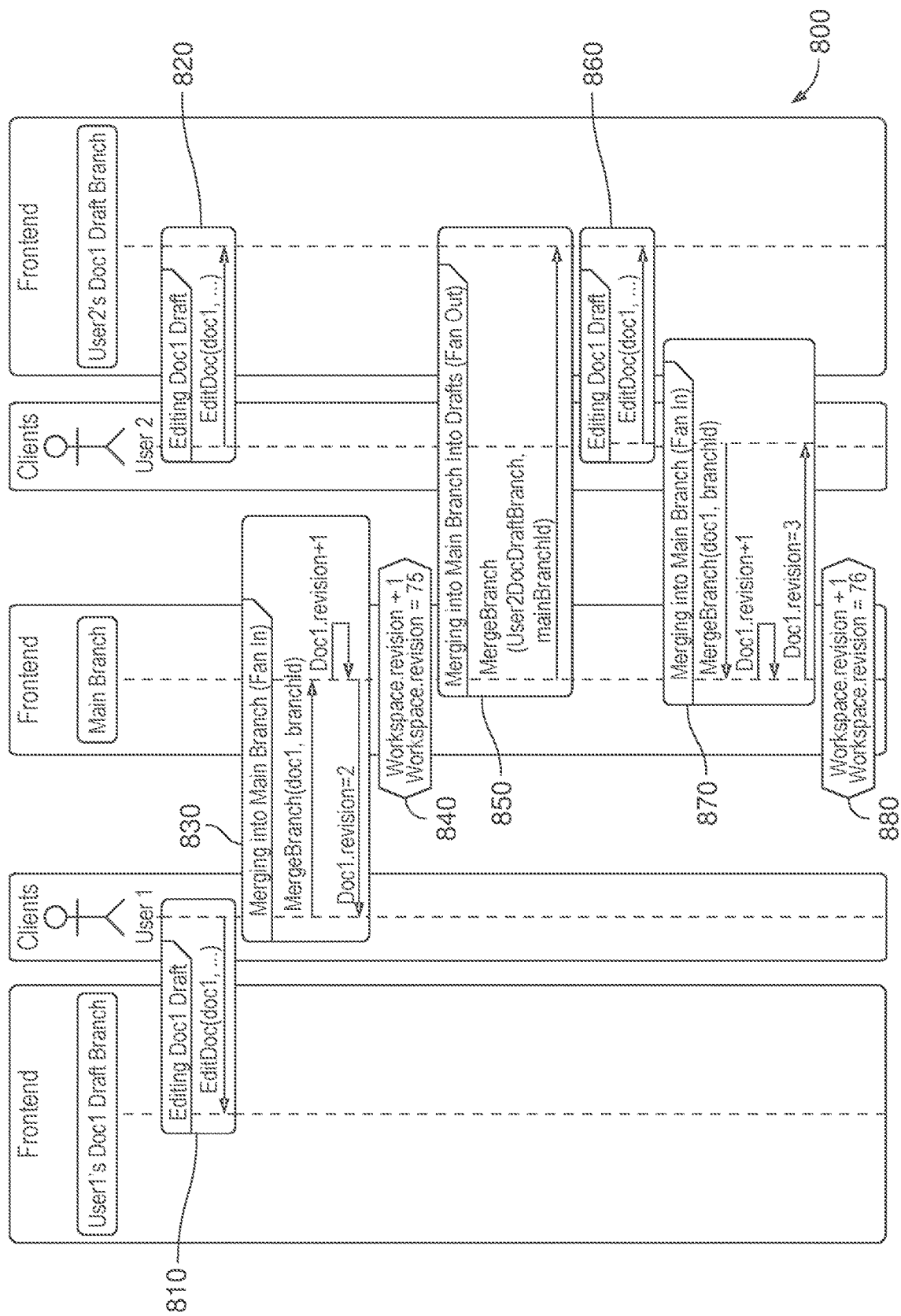
FIG. 8 is a flow diagram showing a sequence of revisions to documents and integration of those revisions into other branches, according to an embodiment.

FIG. 8 is a flow diagram showing a sequence 800 of revisions to documents and integration of those revisions into other branches using the workspace revision counter 340, according to an embodiment. In the embodiment shown in FIG. 8, a first document ("Doc1") is provided for editing to various clients (including Users 1 and 2) by a frontend user interface ("frontend"). In some embodiments, the frontend user interface is provided by the first computing device 100, the fifth computing device 106, or another suitable computing device. In some embodiments, the clients utilize respective ones of the fourth computing devices 104a. In the embodiment shown in FIG. 8, User1 and User2 modify the first document via respective user interfaces. Although only one documents and two clients are shown, in other embodiments, the frontend may provide hundreds of documents to hundreds of clients concurrently.

At block 810, the first user (User1) makes revisions to a secondary branch of the first document (e.g., a "private" branch) that are stored separately from other revisions by the second user (User2), which are performed at block 820. At block 830, the first user requests that the changes from their secondary branch be incorporated into the main branch in a manner similar to that described above with respect to block 750. At block 840, the frontend increments the workspace revision counter 340.

In contrast to the merging of a secondary branch into the main branch (e.g., a "fan-in" action), at block 850, the revisions to the main branch that were fanned in are "fanned out" to the secondary draft of the second user. In various embodiments, the fanning out process is a merge process or a rebase process, as described above.

At block 860, the second user (User2) makes revisions to a secondary branch of the first document that are stored separately from the revisions by the first user. At block 870, the second user incorporates the changes from their secondary branch into the main branch in a manner similar to that described above with respect to block 830. At block 880, the frontend increments the workspace revision counter 340.

Figure 9:
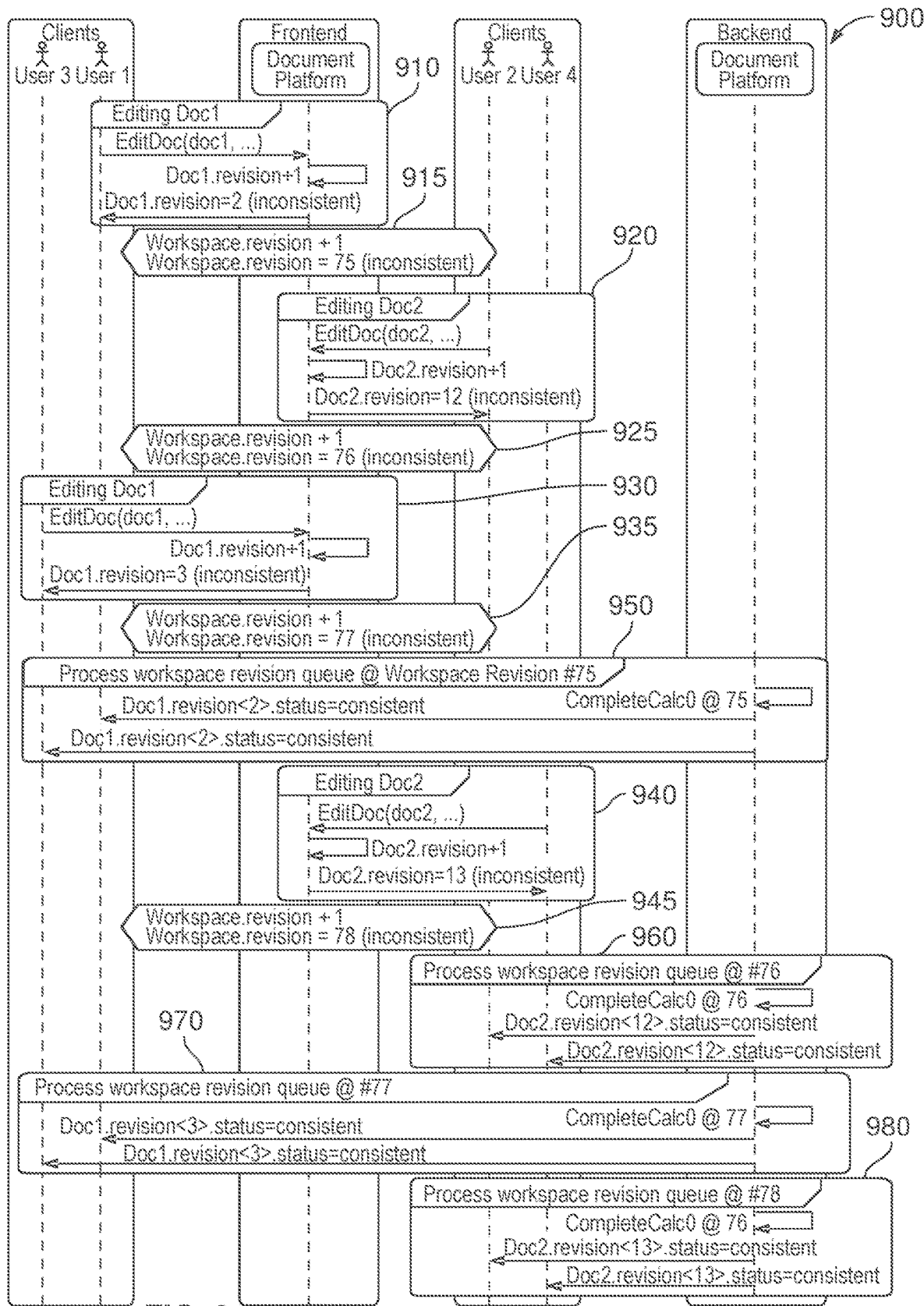
FIG. 9 is a flow diagram showing a sequence of revisions to documents using a workspace revision counter and a workspace revision queue where temporary revisions are displayed.

FIG. 9 is a flow diagram showing a sequence 900 of revisions to documents using a workspace revision counter and workspace revision queue where temporary revisions are displayed, according to an embodiment. In some scenarios, utilization of the workspace revision queue 330 reduces performance (e.g., longer processing times, longer queue times before a revision is performed) due to higher memory requirements for data structures associated with the workspace 310. In an embodiment, for example, a single RTree or causal tree is shared for the plurality of documents in the workspace 310 and has a larger size than separate RTrees for the documents. Additionally, contention for access to the RTree by different documents being revised at the same time may increase the queue times for a revision to be processed.

In the embodiment shown in FIG. 9, the computing device 200 is configured to perform "optimistic" revisions at the document level, but identify those revisions as being "inconsistent" within the user interface until the revision has been processed and determined to be consistent at the workspace level. The optimistic revisions are revisions that are received from a user for a displayed document (e.g., a secondary branch displayed on a user interface 104a), performed for the displayed document and updated on the user interface 104a, but without fully updating formulas or links in the displayed document that refer to other documents, other sections of documents, or external sources. Optimistic revisions provide improved feedback to the user (i.e., near real-time, without having to wait for changes to propagate through the workspace revision queue), but may be incorrect if they rely on the results of a formula calculation or link that has not completed.

As one example, a cell B1 in a first sheet (S1B1) and a cell B3 of a second sheet (S2B3) contains formulas as follows:

$$S1B1=\text{SUM}(S1A1, S1A2, S2B3)$$

$$S2B3=S1A1*3$$

where S1A1 corresponds to a cell A1 of the first sheet with an initial value of "2", S1A2 corresponds to a cell A2 of the first sheet having an initial value of "5". In this example, the cell S2B3 has an initial value of "6" (2*3) and the cell S1B1 has an initial value of "13" (2+5+6). When the user revises cell S1A1 to a value of "4", an optimistic revision indicates a new value of "15" (4+5+6), using the updated value of cell S2A1 but without an update to the value referenced in the second sheet (S2B3). In this example, the value of "15" is shown, but with a temporary identification on the displayed document that indicates that the value is a temporary revision, not a final revision (i.e., with an updated value from cell S2B3). Once the final revision has been propagated, where S2B3 is updated to "12" (4*3) and S1B1 is updated to 21 (4+5+12), the temporary identification is removed. Examples of a temporary identification include a different font color or font face, a different background color, a box that surrounds the value, underlining, or other suitable visual indication.

At blocks 910, 920, 930, and 940, various users revise first and second documents and send requests for the revisions to the frontend, in a manner similarly to that described above with respect to blocks 710, 720, 730, and 740. In the embodiment of FIG. 9, however, the revisions at blocks 910, 920, 930, and 940 are optimistic or temporary until the computing device 200 has finalized the revisions, for example, by updating formulas and links contained within an RTree for the workspace 310. At blocks 910, 920, 930, and 940, the temporary revisions are marked as "inconsistent," as discussed above. Moreover, updates to the workspace revision queue 330 are marked as inconsistent until the revisions have been finalized.

In some embodiments, a separate process is performed for finalizing the revisions using the workspace revision queue, for example, a write-behind consistency process. The write-behind consistency process traverses the entirety of the RTree for the workspace 310 and updates formulas, links, or both formulas and links. In an embodiment, the frontend is provided by the productivity server 100 and the write-behind consistency process is performed by the database server 106. When the write-behind process is complete, the database server 106 marks the workspace revision queue 330, or a particular revision therein, as being consistent. In the embodiment shown in FIG. 9, the write-behind consistency process is shown performing separate final revisions for blocks 910, 920, 930, and 940 at blocks 950, 960, 970, and 980, respectively.

In some embodiments, causing the revision to be performed includes queuing a temporary copy of the revision in a document revision queue that is specific to the document corresponding to the revision. In an embodiment, for example, the document revision queue corresponds to the document revision queue 314. A temporary revision is performed on a computing device that displays a secondary branch of the document corresponding to the revision, without performing a revision on a corresponding main branch of the document. In an embodiment, for example, the productivity server 100 performs the temporary revision on a branch of the first document at block 910, without performing a final revision at block 950 (i.e., before the final revision has been performed). In other embodiments, the temporary revision corresponds to the blocks 920, 930, or 940 of FIG. 9. The revision is queued as a final revision in the workspace revision queue 330 and performed on the main branch, for example, corresponding to blocks 950, 960, 970, or 980 of FIG. 9.

In some embodiments, a received request for a revision indicates a revision to two or more documents. In an embodiment, for example, the request is for a revision to a link where the revision corresponds to a source element within a first document and a destination element within a second document. The link revision is initially queued in the first document revision queue that is specific to the document containing the source element of the link (e.g., the document being edited by the user that makes the request). In an embodiment, this document revision queue is processed by the frontend provided by the productivity server 100. The link revision is initially identified as being "inconsistent" until the write-behind consistency process, performed by the database server 106, further processes the revision and determines that the revision is consistent with other revisions, links, and/or formulas. In an embodiment, the link revision is queued in the workspace revision queue, the write-behind consistency process traverses the RTree for the workspace 310 for the link revision, and queues the link revision in a document revision queue that is specific to the second document containing the destination element.

In some embodiments, revisions or updates to the workspace 310 that originate outside of the workspace 310 are also handled using the write-behind consistency process. In this way, an update to an external document (e.g., outside of the workspace 310) that is relied upon by a document within the workspace 310 is associated with a final revision and reference number for the workspace revision counter 340. In various embodiments, the external document is located on a remote server, cloud service, in a different workspace (e.g., in the workspace 350), or other suitable location.

As discussed above, in some embodiments, the computing device 200 utilizes an RTree as a data structure to store electronic documents of the workspace 310. In an embodiment, the computing device 200 utilizes the RTree for maintaining formulas that reference different cells. In another embodiment, the computing device 200 utilizes the RTree for maintaining both formulas and links to different cells. In this embodiment, a single RTree is utilized for maintaining formulas and links throughout the plurality of documents of the workspace 410. This approach improves detection of circular references across all documents within the workspace 310 and also improves the flow of values from one document to another document over links and formulas. In some embodiments, the computing device 200 maintains separate RTrees (e.g., one or more RTrees per document), but links the RTrees by utilizing a common reference time.

Figure 10:
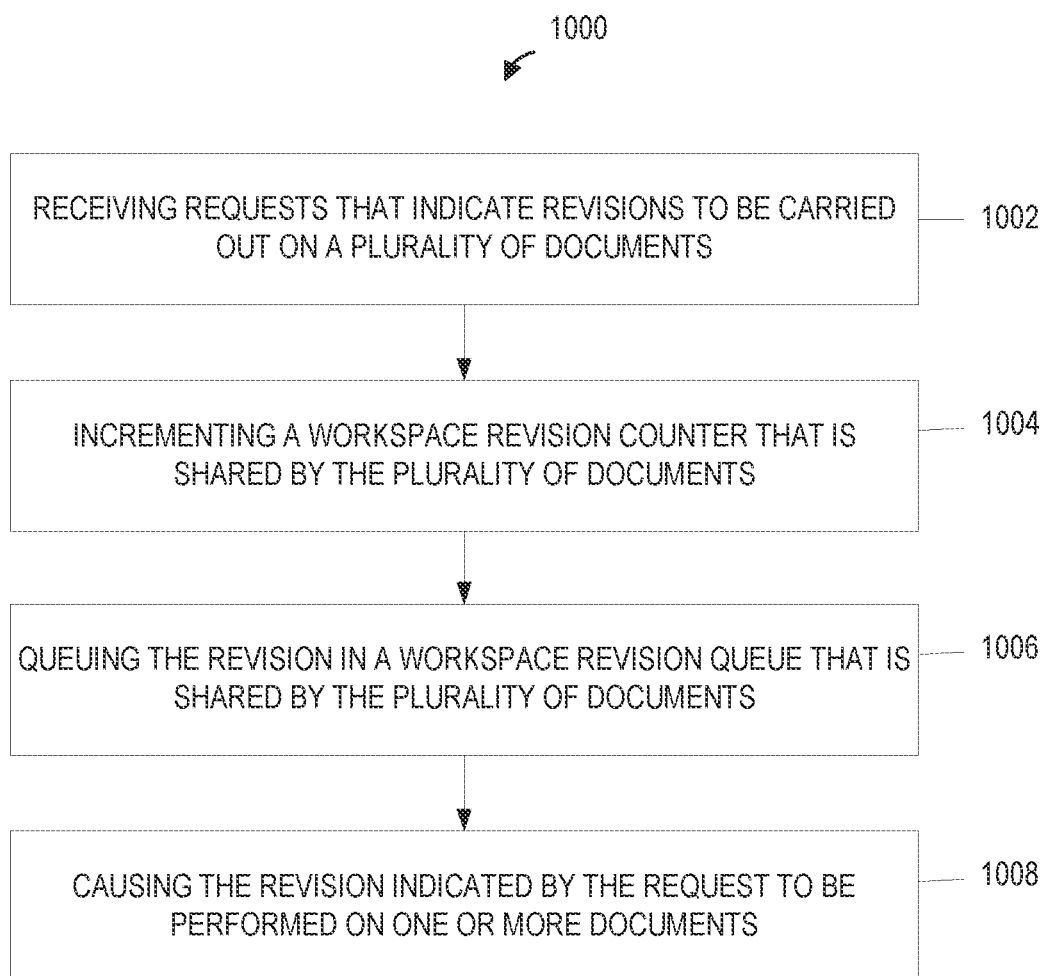
FIG. 10 is a flowchart illustrating an example method, implemented on a server, for rendering linked content in a first document having a table with a plurality of cells, according to an embodiment.

FIG. 10 is a flowchart illustrating an example method, implemented on a server, for maintaining links and revisions for a plurality of documents, according to an embodiment. In some embodiments, the method 1000 is implemented by the productivity server 100 of FIG. 1, which interacts with the database server 106 and the client devices 104. FIG. 10 is described with reference to FIG. 1 for explanatory purposes.

In other embodiments, however, the method 1000 is implemented by another suitable computing device.

At block 1002, requests are received that indicate revisions to be carried out on the plurality of documents. In an embodiment, the plurality of documents corresponds to the plurality of documents in the document table 320 (FIG. 3). In some embodiments, at least one of the requests correspond to revisions for different documents of the plurality of documents, for example, the first document 114 and the second document 116. In various embodiments, the requests correspond to blocks 610, 620, 630, or 640 of FIG. 6, blocks 710, 720, 730, 740, 750, or 760 of FIG. 7, blocks 810, 820, 830, 850, 860, or 870 of FIG. 8, or blocks 910, 920, 930, or 940 of FIG. 9.

At block 1004, a workspace revision counter that is shared by the plurality of documents is incremented. In an embodiment, the workspace revision counter indicates a revision state of the plurality of documents. In some embodiments, the workspace revision counter corresponds to the workspace revision counter 340. In various embodiments, incrementing the workspace revision counter 340 corresponds to blocks 615, 625, 635, or 645 of FIG. 6, blocks 755 or 765 of FIG. 7, blocks 840 or 880 of FIG. 8, or blocks 915, 925, 935, or 945 of FIG. 9.

At block 1006, the revision is queued in a workspace revision queue that is shared by the plurality of documents. In an embodiment, the workspace revision queue corresponds to the workspace revision queue 330.

At block 1008, the revision indicated by the request is caused to be performed on one or more documents of the plurality of documents that correspond to the request.

In some embodiments, the method 1000 further includes displaying a temporary identification that corresponds to the temporary revision on the displayed document and indicates that the temporary revision is not the final revision. The temporary identification is removed from the displayed document when the final revision has been performed. In an embodiment, for example, a temporary revision is shown on a computing device using a different font color or font face, a different background color, a box that surrounds the value, underlining, or other suitable visual indication as the temporary identification at block 910, and the temporary identification is removed at block 950. In some embodiments, at least some user interface features of a user interface on which the document is displayed are disabled while at least some temporary identifications are displayed. In an embodiment, for example, user interface features such as generating a report based on the plurality of documents, exporting the plurality of documents, or other actions are temporarily disabled until the revisions have been finalized.

In an embodiment, the method 1000 further includes receiving a revision for data that is external to the plurality of documents and linked from at least one of the plurality of documents. In an embodiment, the external data corresponds to data from an external workspace, for example, the workspace 350. In another embodiment, the external data corresponds to data from a remote server, cloud service, or other suitable location. The workspace revision counter is incremented based on the revision for the external data. The revision for the external data is queued in the workspace revision queue, i.e., the workspace revision queue 330.

In some embodiments, a document revision or a series of document revisions can be generated with inputs by a reviewer. In some embodiments, a reviewer can provide inputs such as, comments, edits, edits with mark-ups, translations and/or other document review or revision actions to a document or a section of the document. As used herein, a document generated as a result of a reviewer's review and/or revision actions is referred to as a secondary document. In some examples, the document to be reviewed is a mainline document, which is a master copy of a set of related documents. The mainline document and the secondary documents are collectively a set of related documents. In some examples, the document is a blackline document, or referred to as a comparison document, which is a revision to a document showing mark-ups of changes (e.g., additions, modifications, and deletions). A blackline document is a type of a secondary document. In certain examples, a secondary document may be a review document which includes comments to a document (e.g., a mainline document, a secondary document) or a document section. In some examples, a secondary document is a comparison review document that includes comments and/or revisions to a blackline document. In certain examples, a secondary document is a translation document that includes translations of a document (e.g., a mainline document, a secondary document) or a document section.

Figure 11A:
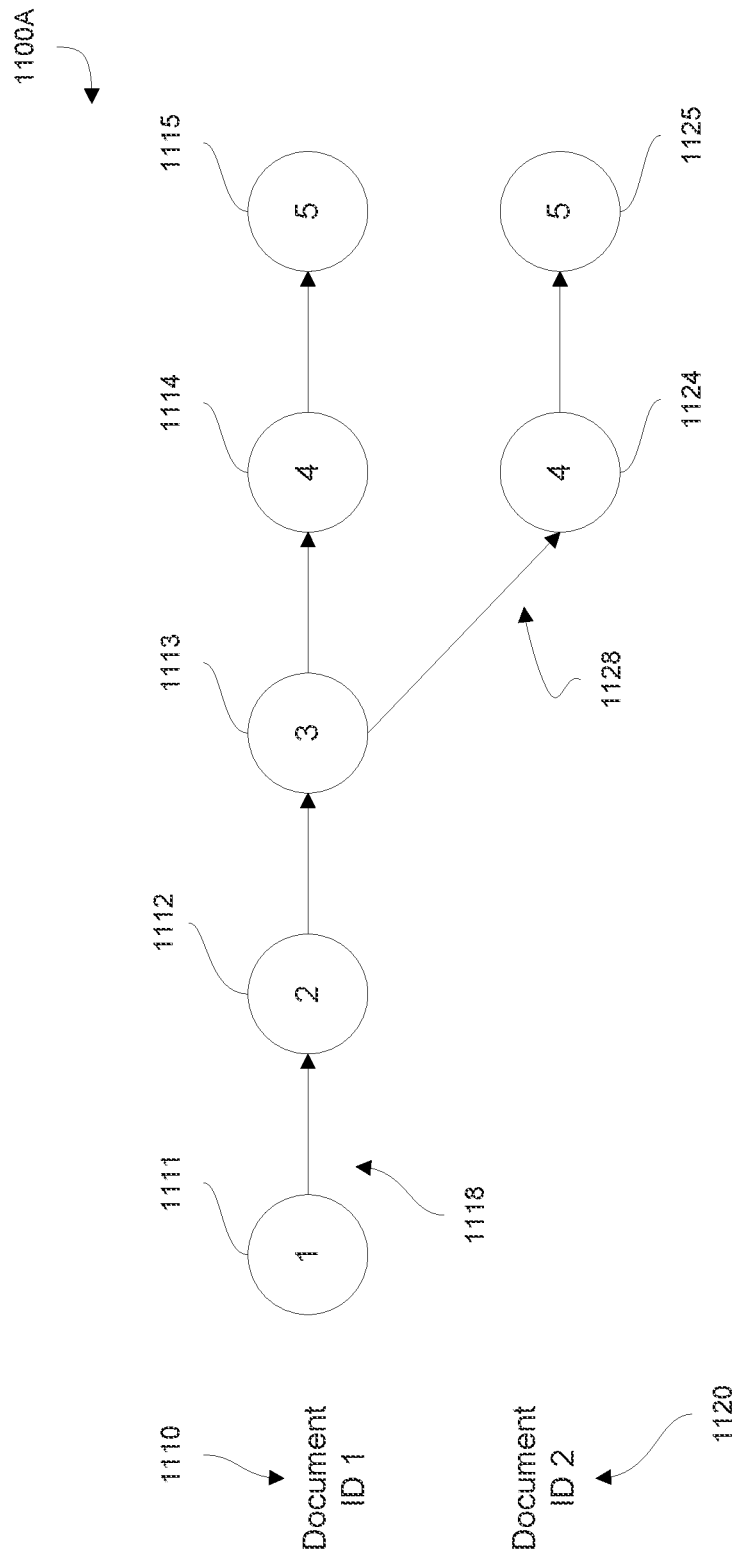
FIG. 11A shows one example of a branch model, in accordance with certain embodiments of the present disclosure.

In certain embodiments, a document or a plurality of related documents are associated with a branch model, which maintain revision relationships, comments, edits, edits with mark-ups, translations, and/or other relationships. FIG. 11A shows one example of a branch model, in accordance with certain embodiments of the present disclosure. In certain embodiments, the branch model can be implemented by a computing device (e.g., the computing device 200 in FIG. 2, the computing devices in FIG. 1, etc.). As illustrated, the branch model 1100A is related to a primary document 1110 (e.g., a mainline document, a secondary document, etc.) associated with document ID 1 and a secondary document 1120 associated with document ID 2. In some examples, the primary document 1110 is a mainline document. In some examples, the primary document 1110 is not a mainline document but is a secondary document. The primary document is associated a branch 1118, or referred to as a primary branch. In some variations, the branch 1118 is a mainline branch, or referred to as a main branch, in the branch model 1100A. The secondary document 1120 is associated with as a secondary branch 1128 in the branch model 1100A. In some examples, the primary document 1110 and/or the secondary document 1120 can be one of a review document, an edited document with mark-ups (or referred to as a comparison document or a blackline document), a comparison review document, a translation document, and other documents generated based on the mainline document.

In certain embodiments, each branch in the branch model 1100 includes a branch type and one or more nodes. In some implementations, each node is associated with a revision of a document (e.g., revision 1 of document 1110) In some examples, each branch in the branch model 1100 is associated with a document with a document identifier. In some embodiments, the primary branch 1118 includes one or more nodes 1111, 1112, 1113, 1114, and 1115, where each node is associated with a revision of the primary document 1110. In some cases, each node is associated with a revision of a document. For example, node 1111 is associated with revision 1 of the document of document ID 1 (e.g., mainline document). For example, node 1112 is associated with revision 2 of the document of document ID 1 (e.g., mainline document). For example, node 1113 is associated with revision 3 of the document of document ID 1 (e.g., mainline document). For example, node 1114 is associated with revision 4 of the document of document ID 1 (e.g., mainline document). For example, node 1115 is associated with revision 5 of the document of document ID 1 (e.g., mainline document).

In certain embodiments, the secondary branch 1128 includes one or more nodes 1124 and 1125, where each node associated with a revision of the secondary document. For example, node 1124 is associated with revision 4 of the document of document ID 2 (e.g., a secondary document). For example, node 1125 is associated with revision 5 of the document of document ID 2 (e.g., a secondary document). In some examples, the branch 1118 is a primary branch that the secondary branch 1128 is generated based on. In certain examples, the secondary branch 1128 is generated based on a revision of the primary document 1110. For example, the secondary branch 1128 is generated based on revision 3 of the primary document 1110 and linked to node 1113. In some examples, the branch 1118 is of a secondary branch type. In one example, the branch 1118 is of a comparison branch type and the branch 1128 is of a comparison review branch type.

In some implementations, a reviewer is only granted a permission to access certain section(s) of a document. In some examples, a reviewer does not have access to the mainline document, but only have access to certain section(s) of a document. In some examples, a reviewer is granted access to the mainline document or all sections of a document.

In some embodiments, a branch in a branch model includes a branch type and one or more nodes. In some variations, the branch type includes a mainline branch type associated with the mainline document (e.g., a master document) and a secondary branch type associated with a secondary document (e.g., a comparison document, a review document, a translation document, etc.). In certain variations, the secondary branch type further includes a review branch type, a comparison branch type, a comparison review branch type, a translation branch type, and other branch types associated with a secondary document. In some implementations, the secondary branch type is associated with a purpose (e.g., review, blackline, translate, etc.) of generating a branch (e.g., a divergence) in the branch model. In some examples, the permission granted to a reviewer is associated with the branch type.

In certain embodiments, the review branch type indicates a branch generated for reviewing a document. In some examples, a reviewer can only add comments during a review and cannot make edits (e.g., additions, modifications, or deletions) to the document being reviewed. In some examples, a reviewer can make additions, modifications, and/or deletions to the document being reviewed and add, modify, or delete comments from the document to be reviewed. In one example of the secondary document 1120 being a review document represented by the review branch 1128, the one or more nodes 1124 and 1125 are associated with document data structures (e.g., RTree, causal tree, causal graph, cells, etc.) containing comments provided by the reviewer. In one example of the secondary document 1120 being a review document represented by the review branch 1128, the one or more nodes 1124 and 1125 associated with document data structures (e.g., RTree, causal tree, causal graph, cells, etc.) containing comments edits (e.g., additions, modifications, and/or deletions), and/or edits with mark-ups provided by the reviewer.

In some embodiments, the comparison branch type indicates a branch generated for editing a document with mark-ups, or referred to as a comparison document (e.g., blackline document). In one example of the secondary document 1120 being a comparison document represented by the comparison branch 1128, the one or more nodes 1124 and 1125 are associated with document data structures (e.g., RTree, causal tree, causal graph, cells, etc.) containing blacklines, such as mark-ups showing additions, modifications, and deletions, provided by the reviewer.

In certain embodiments, the comparison review branch type indicates a branch generated for reviewing a comparison document (e.g., a blackline document). In some examples, a reviewer provides comments to the comparison document. In some examples, a reviewer can make additions, modifications, and/or deletions to the document being reviewed and add, modify, or delete comments from the document to be reviewed. In one example of the secondary document 1120 being a comparison review document represented by the comparison review branch 1128, the one or more nodes 1124 and 1125 are associated with document data structures (e.g., RTree, causal tree, causal graph, cells, etc.) containing comments provided by the reviewer. In one example of the secondary document 1120 being a comparison review document represented by the comparison review branch 1128, the one or more nodes 1124 and 1125 associated with document data structures (e.g., RTree, causal tree, cells, etc.) containing comments and/or changes (e.g., additions, modifications, and/or deletions) provided by the reviewer.

In some embodiments, the translation branch type indicates a branch generated for translating a document or a document section. In some examples, a reviewer can provide transactions to the document or the document section. In one example of the secondary document 1120 being a translated document represented by the translation branch 1128, the one or more nodes 1124 and 1125 are associated with document data structures (e.g., RTree, causal tree, cells, etc.) containing translations provided by the reviewer.

In some embodiments, branch 1128 indicates a divergence from the mainline branch 1118. In one example, branch 1128 in the branch model 1100 includes a data structure illustrated in Table 1. The branch 1128 includes a BranchID, a BranchedFromID, a BranchedFromRevision, and a BranchType. The BranchID is the identifier of the branch. The BranchedFromID is the document identifier of the document (e.g., mainline document, secondary document, etc.) from which the branch is created. The BranchedFromRevision is the document revision of the document from which the branch is created. For example, branch 1128 has a BranchedFromID being the Document ID 1 and BranchedFromRevision being "3".

TABLE 1

| Field | Type | Length |
| --- | --- | --- |
| BranchID | VARCHAR | 255 |
| BranchedFromID | VARCHAR | 255 |
| BrancedFromRevision | BIGINT | 20 |
| BranchType | INT | 11 |

Using the branch model illustrated in FIG. 11A, the data structures representing the mainline document revision does not need to be duplicated. Instead, the revisions of a secondary document (e.g., revisions 4 and 5 of the secondary document) are linked to the data structures of the mainline document where the branch is generated.

In some embodiments, when an input (e.g., reviews, comments, blacklines, translations, etc.) from a reviewer is requested, a computing device (e.g., the computing device 200 in FIG. 2, the computing devices in FIG. 1, etc.) generates the secondary branch 1128 at a branch creation time, based upon a node 1113 of the primary branch 1118. In some examples, the node 1113 of the primary branch 1118 is associated with a current revision of the primary document 1110 at the branch creation time. In some examples, when the input from a reviewer is received, the computing device generates a node (e.g., node 1124) associated with a document revision incorporating the input and adds the node to the secondary branch 1128. If the secondary branch 1128 exists, when the input from a reviewer is received, the computing device generates a node (e.g., node 1125) associated with a document revision incorporating the input and adds the node to the secondary branch 1128.

In certain embodiments, when an input from a reviewer is requested, the computing device checks whether a corresponding secondary branch 1128 exists. In some examples, the secondary branch 1128 is corresponding to the reviewer, a reviewer group, and/or the type of the input request. In some examples, the secondary branch 1128 is corresponding to a revision of the primary document and the type of the input request. If a secondary branch does not exist, the computing device generates the secondary branch 1128 of a secondary branch type, where the secondary branch type corresponds to the type of the input being requested. In some examples, the computing device generates a node (e.g., node 1124) representing a document revision incorporating the input and adds the node to the secondary branch. If the secondary branch 1128 exists, when the input from a reviewer is received, the computing device generates a node (e.g., node 1125) associated with a document revision incorporating the input and adds the node to the secondary branch 1128. In certain embodiments, the input can be selectively incorporated into the primary document 1110 as a revision. In some embodiments, the input can be selectively incorporated into a corresponding mainline document as a revision.

In some embodiments, when an input is received from a reviewer, the computing device checks whether a corresponding secondary branch 1128 exists. If a secondary branch associated with the reviewer does not exist, the computing device generates the secondary branch 1128 of a secondary branch type corresponding to the type of the input. In some examples, the computing device generates a node (e.g., node 1124) associated with a document revision incorporating the input and adds the node to the secondary branch 1128. If the secondary branch 1128 exists, when the input from a reviewer is received, the computing device generates a node (e.g., node 1125) associated with a document revision incorporating the input and adds the node to the secondary branch 1128.

In certain embodiments, the computing device generates a node representing a revision of the primary or mainline document based upon the input and adds the node to the primary or mainline branch. In one example of the input being one or more comments from the reviewer, the revision of the primary or mainline document can be the primary or mainline document with the one or more comments. In one example of the input being one or more comments from the reviewer, the revision of the primary or mainline document can be the primary or mainline document with blacklines, where the blacklines are generated based on the one or more comments. In one example of the input being one or more blacklines from the reviewer, the revision of the primary or mainline document can be the primary or mainline document with blacklines. In one examples of the input being translations from the reviewer, revision of the primary or mainline document can be a localized (i.e., translated) version of the primary or mainline document or a document section of the primary or mainline document.

Figure 11B:
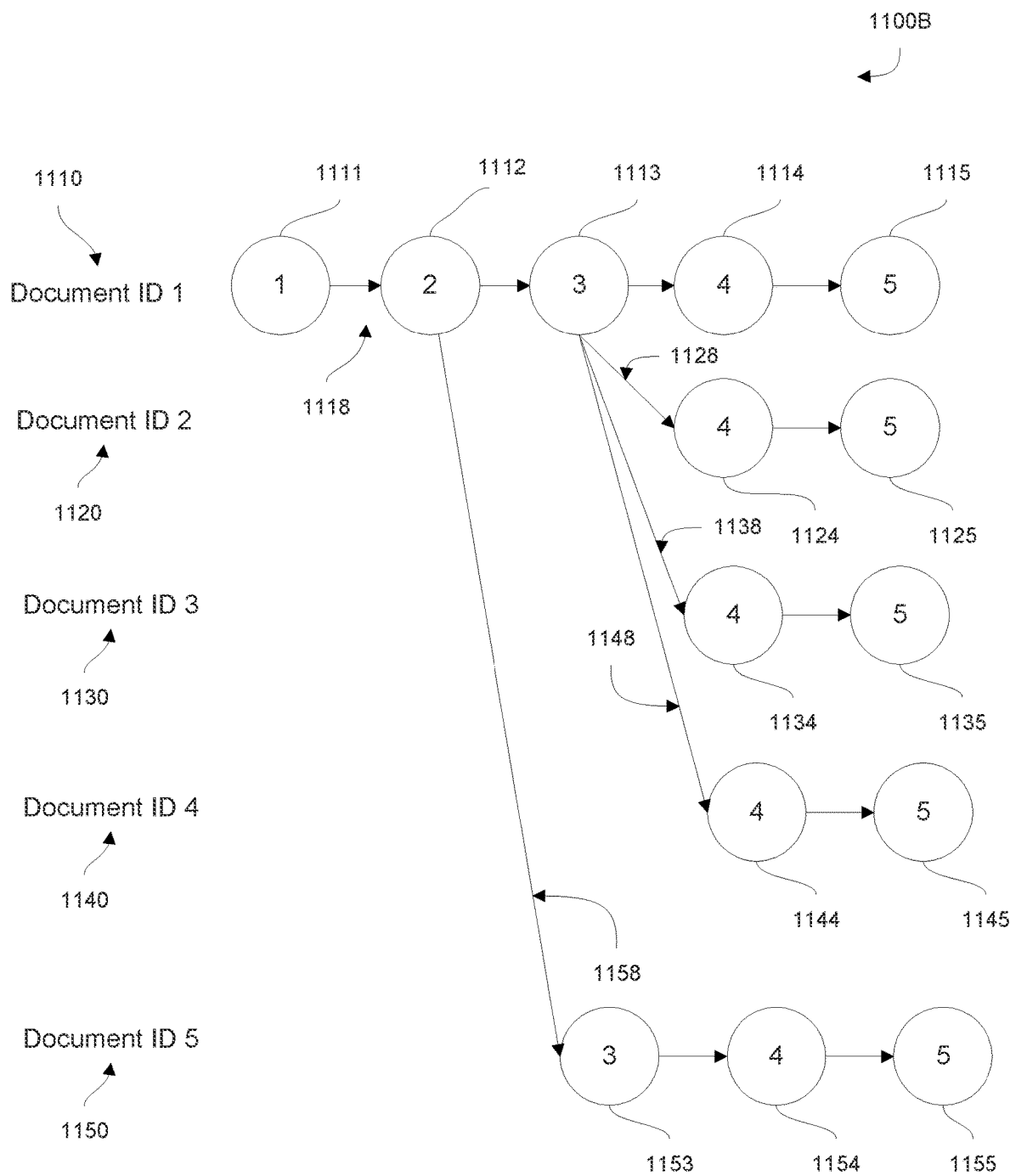
FIG. 11B shows another example of a branch model, in accordance with certain embodiments of the present disclosure.

FIG. 11B shows another example of a branch model, in accordance with certain embodiments of the present disclosure. In certain embodiments, the branch model 1100B can be implemented by a computing device (e.g., the computing device 200 in FIG. 2, the computing devices in FIG. 1, etc.). As illustrated, the branch model 1100B is related to a primary document 1110 (e.g., a mainline document, a secondary document, etc.) associated with document ID 1, a secondary document 1120 associated with document ID 2, a secondary document 1130 associated with document ID 3, a secondary document 1140 associated with document ID 4, and a secondary document 1150 associated with document ID 5. In some examples, the primary document 1110 is a mainline document. In some examples, the primary document 1110 is not a mainline document. The primary document is associated a branch 1118, or referred to as a primary branch. In some variations, the branch 1118 is a mainline branch, or referred to as a main branch, in the branch model 1100B.

The secondary document 1120 is associated with as a secondary branch 1128 in the branch model 1100B. The secondary document 1130 is associated with as a secondary branch 1138 in the branch model 1100B. The secondary document 1140 is associated with as a secondary branch 1148 in the branch model 1100B. The secondary document 1150 is associated with as a secondary branch 1158 in the branch model 1100B. In some examples, the primary document 1110 and/or any one of the secondary documents (1120, 1130, 1140, 1150) can be one of a review document, an edited document with mark-ups (or referred to as a comparison document or a blackline document), a comparison review document, a translation document, and other documents generated based on the mainline document.

In certain embodiments, each branch (e.g., 1118, 1128, 1138, 1148, and 1158) in the branch model 1100 includes a branch type and one or more nodes. In some examples, each branch in the branch model 1100 is associated with a document with a document identifier. In some embodiments, the primary branch 1118 includes one or more nodes 1111, 1112, 1113, 1114, and 1115, where each node is associated with a revision of the primary document 1110. In some cases, each node is associated with a revision of a document. For example, node 1111 is associated with revision 1 of the document of document ID 1 (e.g., mainline document). For example, node 1112 is associated with revision 2 of the document of document ID 1 (e.g., mainline document). For example, node 1113 is associated with revision 3 of the document of document ID 1 (e.g., mainline document). For example, node 1114 is associated with revision 4 of the document of document ID 1 (e.g., mainline document). For example, node 1115 is associated with revision 5 of the document of document ID 1 (e.g., mainline document).

In certain embodiments, the secondary branch 1128 includes one or more nodes 1124 and 1125, where each node associated with a revision of the secondary document. For example, node 1124 is associated with revision 4 of the document of document ID 2 (e.g., a secondary document). For example, node 1125 is associated with revision 5 of the document of document ID 2 (e.g., a secondary document). In some examples, the branch 1118 is a primary branch that the secondary branches 1128, 1138, 1148, and 1158 are generated based on. In some examples, the branch 1118 is of a secondary branch type. For example, the branch 1118 is of a comparison branch type and the branch 1128 is of a comparison review branch type.

In some implementations, a reviewer is only granted a permission to access certain section(s) of a document. In some examples, a reviewer does not have access to the mainline document, but only have access to certain section(s) of a document. In some examples, a reviewer is granted access to the mainline document or all sections of a document. In some embodiments, each branch type is associated with a specific permission. In certain embodiments, each branch is associated with a specific permission. In some examples, a permission allows edits with mark-ups and comments. In certain examples, a permission only allows comments. In some examples, a permission only allows translations.

In some embodiments, a branch in a branch model includes a branch type and one or more nodes. In some variations, the branch type includes a mainline branch type associated with the mainline document (e.g., a master document) and a secondary branch type associated with a secondary document (e.g., a blackline document, a review document, a translation document, etc.). In certain variations, the secondary branch type further includes a review branch type, a comparison branch type, a comparison review branch type, a translation branch type, and other branch types associated with a secondary document. In some implementations, the secondary branch type is associated with a purpose (e.g., review, blackline, translation, etc.) of generating a branch (e.g., a divergence) in the branch model.

In certain embodiments, the review branch type indicates a branch generated for reviewing a document. In some examples, a reviewer can only add comments during a review and cannot make additions, modifications, or deletions to the document being reviewed. In some examples, a reviewer can make additions, modifications, and/or deletions to the document being reviewed and add, modify, or delete comments from the document to be reviewed. In one example, the secondary branch 1128 is a review branch and the one or more nodes 1124 and 1125 are associated with document data structures (e.g., RTree, causal tree, causal graph, cells, etc.) containing comments provided by the reviewer. In one example of the secondary document 1120 being a review document represented by the review branch 1128, the one or more nodes 1124 and 1125 associated with document data structures (e.g., RTree, causal tree, causal graph, cells, etc.) containing comments, edits (e.g., additions, modifications, and/or deletions), and/or edits with mark-ups provided by the reviewer. In the example illustrated, the secondary branch 1128 is linked to the node 1113.

In one example, the secondary branch 1138 is a review branch and the one or more nodes 1134 and 1135 are associated with document data structures (e.g., RTree, causal tree, causal graph, cells, etc.) containing comments provided by the reviewer. In one example of the secondary document 1130 being a review document represented by the review branch 1138, the one or more nodes 1134 and 1135 associated with document data structures (e.g., RTree, causal tree, causal graph, cells, etc.) containing comments, edits (e.g., additions, modifications, and/or deletions), and/or edits with mark-ups provided by the reviewer. In one example, the secondary branch 1128 is associated with a first group of reviewers and the secondary branch 1138 is associated with a second group of reviewers.

In some embodiments, the comparison branch type indicates a branch generated for editing a document with mark-ups, or referred to as a comparison document (e.g., blackline document). In one example, the secondary branch 1128 is a comparison branch, the one or more nodes 1124 and 1125 are associated with document data structures (e.g., RTree, causal tree, causal graph, cells, etc.) containing blacklines, such as mark-ups showing additions, modifications, and deletions, provided by the reviewer. In one example, the secondary branch 1138 is also a comparison branch, and the one or more nodes 1134 and 1135 are associated with document data structures (e.g., RTree, causal tree, causal graph, cells, etc.) containing blacklines, such as mark-ups showing additions, modifications, and deletions, provided by the reviewer. In one example, the secondary branch 1128 is associated with a first group of reviewers and the secondary branch 1138 is associated with a second group of reviewers. In the example illustrated, the secondary branch 1138 is linked to the node 1113.

In certain embodiments, the secondary branch 1148 is a comparison branch associated with a comparison between document revisions associated with the secondary branch 1128 and document revisions associated with the secondary branch 1138. In one example, the one or more nodes 1144 and 1145 are associated with document data structures (e.g., RTree, causal tree, cells, etc.) containing comparisons of documents. In the example illustrated, the secondary branch 1148 is linked to the node 1113. In one example, the revision 4 of document 1140 is a comparison document by comparing the revision 4 of document 1120 with the revision 4 of document 1130.

In some embodiments, the translation branch type indicates a branch generated for translating a document or a document section. In some examples, a reviewer can provide transactions to the document or the document section. In one example, the secondary branch 1158 is a translation branch, the one or more nodes 1153, 1154 and 1155 are associated with document data structures (e.g., RTree, causal tree, cells, etc.) containing translations provided by the reviewer. In the example illustrated, the secondary branch 1158 is linked to the node 1112 and generated based on revision 2 of document 1110.

In some embodiments, the branch model 1100B supports various queries. In some examples, the computing device conducts a query of certain reviews and/or certain comparisons. In one example, the document revisions associated with the secondary branches 1128, 1138, and 1148 are query results in response to a query of certain reviews. In certain examples, the computing device conducts a query of translations. In one example, the document revisions associated with the secondary branch 1158 are query results in response to a query of translations.

Figure 12:
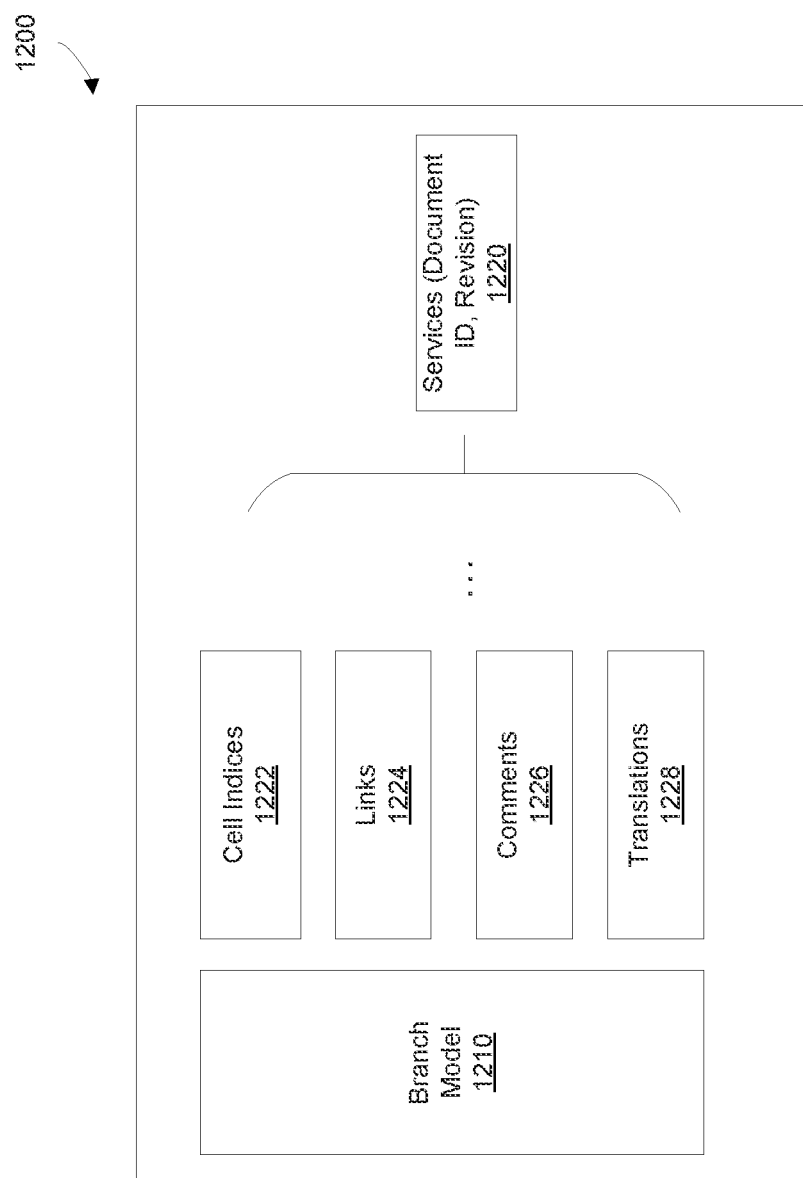
FIG. 12 illustrates one example of a document data structure using a branch model, in accordance with certain embodiments of the present disclosure.

FIG. 12 illustrates one example of a document data structure 1200 using a branch model, in accordance with certain embodiments of the present disclosure. As illustrated, the document data structure 1200 includes a plurality of document services, where each service is associated with a document identifier and a document revision identifier. In some examples, the plurality of document services include one or more of cell indices services 1222, link services 1224, comment services 1226, translation services 1228, and other services. The cell indices services 1222 store and provide cell indices of a document revision. The link services 1224 store and provide links of a document revision. The comment services 1226 store and provide comments of a document revision. The translation services 1228 store and provide translations of a document revision. In some embodiments, each service of the plurality of services 1220 is associated with a node in the branch model 1210, where the node in the branch model 1210 is associated with a respective document revision.

Figure 13:
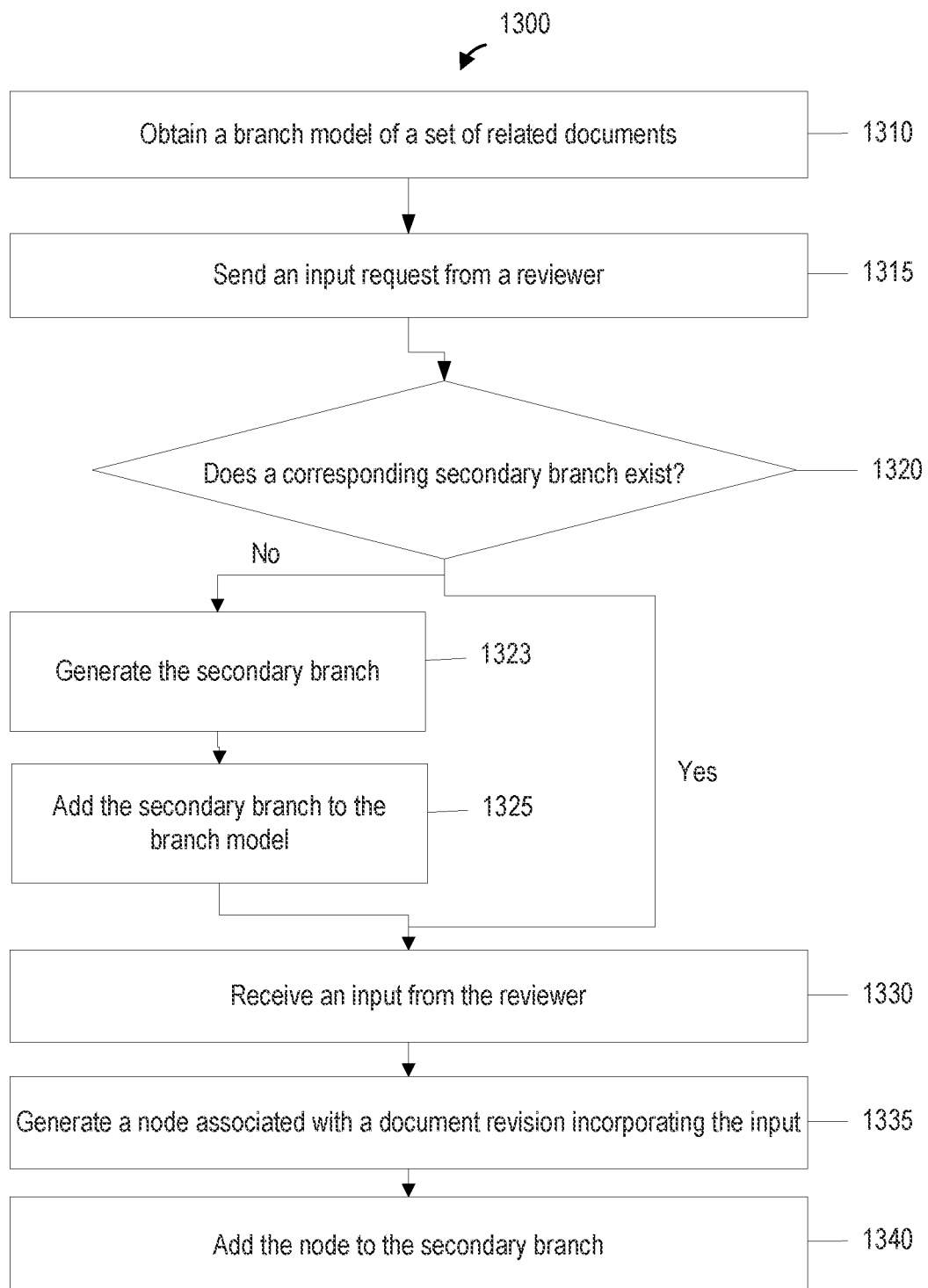
FIG. 13 is a flowchart illustrating one example of a method for using a branch model, in accordance with certain embodiments of the present disclosure.

FIG. 13 is a flowchart illustrating one example of a method 1300 for using a branch model, in accordance with certain embodiments of the present disclosure. Aspects of embodiments of the method 1300 are performed, for example, by a computing device (e.g., the computing devices in FIG. 1, the computing device 200 in FIG. 2). In some implementations, one or more steps of method 1300 are optional and/or modified by one or more steps of other embodiments described herein. In some implementations, one or more steps of other embodiments described herein are added to the method 1300. In some embodiments, the computing device obtains a branch model associated with a set of related documents (1310). In some examples, the set of related documents includes a mainline document and one or more secondary document that are generated by review and revision actions. In some examples, the branch model comprises one or more branches, where each branch of the one or more branches comprises a branch type and one or more nodes. In certain examples, each branch of the one or more branches is associated with a document with a document identifier. In some examples, the one or more branches comprise a mainline branch of a mainline branch type and associated with a mainline document, where the mainline branch type indicates a branch is associated with the mainline document that is the master document.

In certain embodiments, the computing device sends an input request from a reviewer (1315). The input request can be a review of a document or a document section, a comparison review of a document or a document section, a review of a blackline document or a document section in the blackline document, a translation of a document or a document section, and/or other review and revision request. The computing device may grant the reviewer a permission to access the document or the document section according to the input request. In some examples, the document being requested for input is referred to as the primary document. In some examples, the primary document is associated with a branch, or referred to as a primary branch.

In some embodiments, the computing device checks whether a corresponding secondary branch exists (1320). In some cases, the secondary branch is corresponding to the reviewer and/or the type of the input. In some cases, the secondary branch is corresponding to a revision of the primary document and a type of the input request. If the secondary branch does not exist, the computing device generates a secondary branch (1323) of a secondary branch type corresponding to the type of the input, where the secondary branch is associated with a secondary document. In some examples, the secondary branch includes a branch type, a documentation identifier of the primary document, and a revision identifier of the document revision that the branch is created based upon. In some variations, the secondary branch is generated based upon a current node of the primary branch at a branch creation time, where the current node of the primary branch is associated with a current revision of the primary document at the branch creation time. In certain variations, the branch type comprises at least one of a mainline branch type, a review branch type, a comparison branch type, a comparison review branch type, and a translation branch type.

In some implementations, the computing device further adds the secondary branch to the branch model (1325). In some examples, the secondary branch is added from the node associated with the revision of the primary document that is requested input. In some examples, a secondary document with a unique document identifier is generated and associated with the secondary branch. In some variations, the secondary document is associated with the node associated with the revision of the primary document that is requested input.

In certain embodiments, the computing device receives an input associated with the secondary document from the reviewer (1330). In some examples, the computing device generates a node associated with a secondary document revision (e.g., a document revision of the secondary document) incorporating the input (1335). In some variations, a document revision incorporating the input is to include the comments from the reviewer in the document revision. In certain variations, a document revision incorporating the input is to include changes based upon the comments from the reviewer in the document revision. In some variations, a document revision incorporating the input is to include the blackline(s) from the reviewer in the document revision. In certain variations, a document revision incorporating the input is to include the translations from the reviewer in the document revision or to replace a part or all of the document with the translations from the reviewer in the document revision.

In some embodiments, the computing device adds the node associated with the secondary document revision to secondary branch in the branch model (1340). In certain embodiments, the computing device generates a node associated with a revision of a primary or mainline document based upon the input and adds the node to the primary or mainline branch. In some examples, the revision of the mainline document is populated to one or more secondary documents.

In certain embodiments, each document revision is represented by one or more document services such as cell indices services, comment services, link services, translation services, and/or other document services. In some examples, each document service of a respective document revision is associated with one of the one or more nodes in the branch model.

Figure 14:
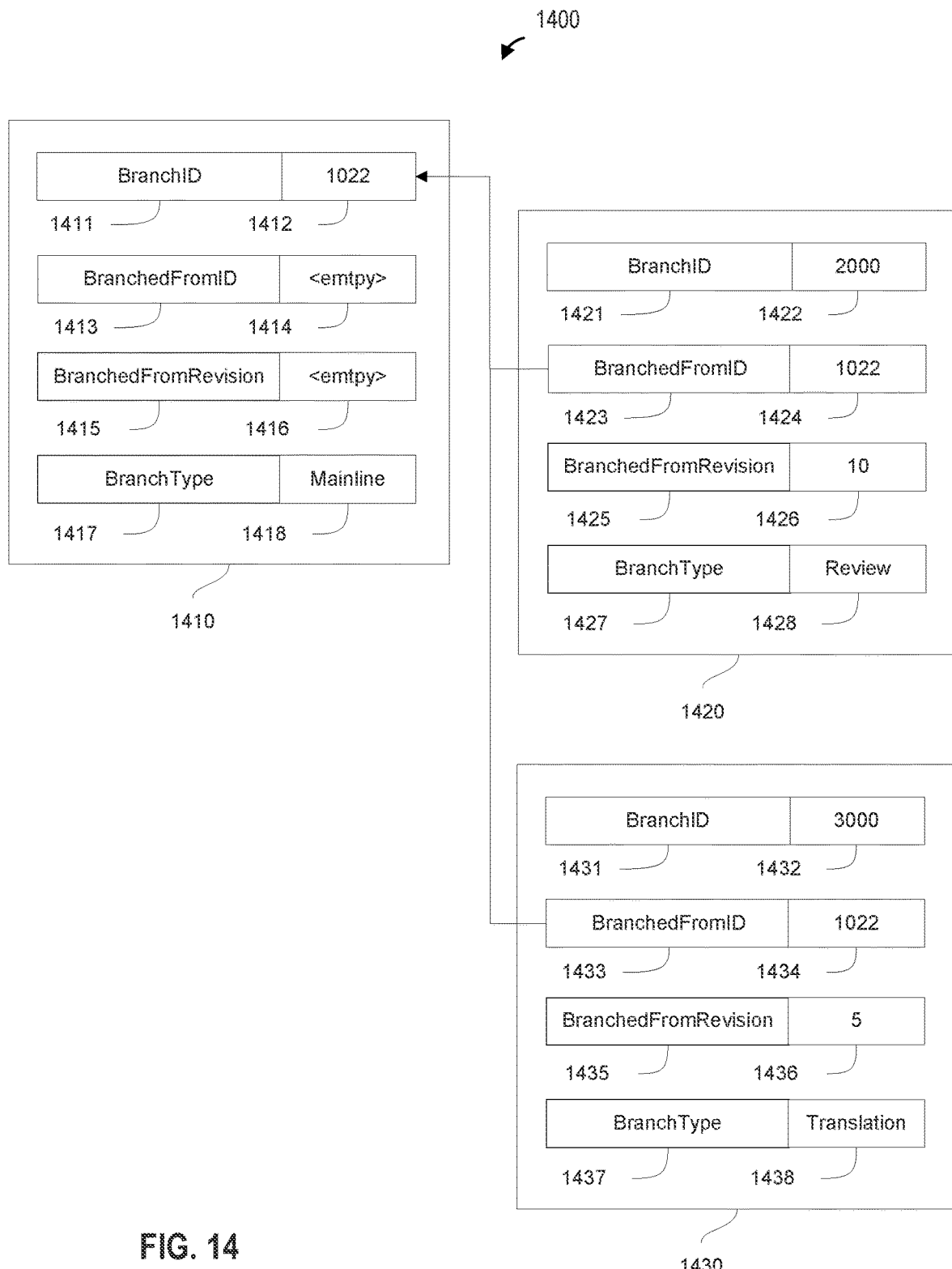
FIG. 14 is a data diagram of one example of a branch model, in accordance with certain embodiments of the present disclosure.

FIG. 14 is a data diagram of one example of a branch model 1400, in accordance with certain embodiments of the present disclosure. As illustrated, the branch model 1400 includes a primary branch 1410 and secondary branches 1420 and 1430. In some embodiments, each branch is represented by a data structure including a BranchID, a BranchedFromID, a BranchedFromRevision, and a Branch-Type. In one example, the primary branch 1410 includes a data structure of data fields 1411, 1413, 1415 and 1417, and data values 1412, 1414, 1416, and 1418. In one example, the primary branch 1410 is a mainline branch, such that the BranchType 148 has the value of "Mainline", the BranchedFromID 1414 has the value of "<empty>" and the BranchedFromRevision 1416 has the value of "<empty>".

The secondary branch 1420 includes a data structure of data fields 1421, 1423, 1425 and 1427, and data values 1422, 1424, 1426, and 1428. In this example, the secondary branch 1420 is a branch from the primary branch 1410, such that BranchedFromID 1424 has the value of "1022" being the BranchID of the primary branch 1410. The secondary branch 1420 is generated based on revision 10 as indicated by the BracnchedFromRevision 1425 with a value 1426 of "10". The secondary branch 1420 is a review branch as indicated by the BranchType 1427 with a value 1428 of "Review".

The secondary branch 1430 includes a data structure of data fields 1431, 1433, 1435 and 1437, and data values 1432, 1434, 1436, and 1438. In this example, the secondary branch 1430 is a branch from the primary branch 1410, such that BranchedFromID 1434 has the value of "1022" being the BranchID of the primary branch 1410. The secondary branch 1420 is generated based on revision 5 as indicated by the BracnchedFromRevision 1435 with a value 1436 of "5". The secondary branch 1430 is a translation branch as indicated by the BranchType 1437 with a value 1438 of "Translation".

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method implemented by one or more processors, the method comprising:
    obtaining, by the one or more processors, a branch model associated with a set of related documents, the branch model comprising one or more branches, each branch of the one or more branches comprising a branch type and one or more nodes, the one or more branches comprising a primary branch associated with a primary document and a secondary branch associated with a secondary document, the set of related documents comprising the primary document having a first document identifier and the secondary document having a second document identifier, the second document identifier being different from the first document identifier, the secondary branch being linked to a first node in the primary branch;

receiving, by the one or more processors, an input associated with the secondary document from a reviewer;

generating, by the one or more processors, a second node, the second node associated with a document revision of the secondary document incorporating the input; and adding, by the one or more processors, the second node to the secondary branch;

wherein the secondary branch is associated with the first document identifier, a revision identifier associated with the revision of the primary document, and a secondary branch type corresponding to a type of the input.

2. The method of claim 1, wherein the input comprises at least one of a comment associated with the secondary document or a document section of the secondary document, an edit to the secondary document or a document section of the secondary document, a comparison of the secondary document or a document section of the secondary document, and a translation of the secondary document or a document section of the secondary document.

3. The method of claim 1, wherein the secondary branch is associated with a permission of accessing the secondary document or a document section of the secondary document.

4. The method of claim 3, wherein the permission is based at least in part on a branch type of the secondary branch.

5. The method of claim 3, wherein the permission associated with the secondary branch is different from a permission associated with the primary branch.

6. The method of claim 1, wherein the one or more branches further comprise a third branch associated with a third document and a third branch type, wherein the third branch type is different from the secondary branch type.

7. The method of claim 1, wherein the branch type comprises at least one of a mainline branch type, a review branch type, a comparison branch type, a comparison review branch type, and a translation branch type.

8. The method of claim 1, further comprising:
generating, by the one or more processors, a third node associated with a revision of the primary document based upon the input; and
adding, by the one or more processors, the third node to the primary branch.

9. The method of claim 1, wherein each branch of the one or more branches is associated with a document with a document identifier.

10. The method of claim 9, wherein the document is represented by one or more document services, wherein each document service of the plurality of document services is associated with one of the one or more nodes in the branch model.

11. The method of claim 10, wherein the one or more document services comprise at least one of cell indices services, link services, comment services, and translation services.

12. A computing device comprising:
one or more memories storing instructions; and
one or more processors configured to execute the instructions to perform operations comprising:
obtaining, by the one or more processors, a branch model associated with a set of related documents, the branch model comprising one or more branches, each branch of the one or more branches comprising a branch type and one or more nodes, the one or more branches comprising a primary branch associated with a primary document and a secondary branch associated with a secondary document, the set of related documents comprising the primary document having a first document identifier and the secondary document having a second document identifier, the second document identifier being different from the first document identifier, the secondary branch being linked to a first node in the primary branch;

receiving an input associated with the secondary document from a reviewer;

generating a second node, the second node associated with a document revision of the secondary document incorporating the input; and adding the second node to the secondary branch;

wherein the secondary branch is associated with the first document identifier, a revision identifier associated with the revision of the primary document, and a secondary branch type corresponding to a type of the input.

13. The computing device of claim 12, wherein the input comprises at least one of a comment associated with the secondary document or a document section of the secondary document, an edit to the secondary document or a document section of the secondary document, a comparison of the secondary document or a document section of the secondary document, and a translation of the secondary document or a document section of the secondary document.

14. The computing device of claim 12, wherein the secondary branch is associated with a permission of accessing the secondary document or a document section of the secondary document.

15. The computing device of claim 14, wherein the permission is based at least in part on a branch type of the secondary branch.

16. The computing device of claim 14, wherein the permission associated with the secondary branch is different from a permission associated with the primary branch.

17. The computing device of claim 12, wherein the one or more branches further comprise a third branch associated with a third document and a third branch type, wherein the third branch type is different from the secondary branch type.

18. The computing device of claim 12, wherein the branch type comprises at least one of a mainline branch type, a review branch type, a comparison branch type, a comparison review branch type, and a translation branch type.

19. The computing device of claim 12, where the operations further comprise:
generating, by the one or more processors, a third node associated with a revision of the primary document based upon the input; and
adding, by the one or more processors, the third node to the primary branch.

20. The computing device of claim 12, wherein each branch of the one or more branches is associated with a document with a document identifier.

21. The computing device of claim 20, wherein the document is represented by one or more document services, wherein each document service of the plurality of document services is associated with one of the one or more nodes in the branch model.

22. The computing device of claim 21, wherein the one or more document services comprise at least one of cell indices services, link services, comment services, and translation services.

* * * * *